(12) United States Patent
Soehnlen et al.

(10) Patent No.: US 11,401,152 B2
(45) Date of Patent: Aug. 2, 2022

(54) APPARATUS, SYSTEM, AND METHOD OF TRANSPORTING FLUID PRODUCTS

(71) Applicant: CREATIVE EDGE DESIGN GROUP LTD., Canton, OH (US)

(72) Inventors: Daniel P. Soehnlen, Canton, OH (US); Gregory M. Soehnlen, N. Canton, OH (US)

(73) Assignee: CREATIVE EDGE DESIGN GROUP, LTD., Canton, OH (US)

( * ) Notice: Subject to any disclaimer, the term of this patent is extended or adjusted under 35 U.S.C. 154(b) by 0 days.

(21) Appl. No.: 17/075,838

(22) Filed: Oct. 21, 2020

(65) Prior Publication Data

US 2021/0032090 A1    Feb. 4, 2021

Related U.S. Application Data

(63) Continuation of application No. 15/360,320, filed on Nov. 23, 2016, now Pat. No. 10,822,221.

(60) Provisional application No. 62/259,965, filed on Nov. 25, 2015.

(51) Int. Cl.
*B67D 7/02* (2010.01)
*B67D 7/78* (2010.01)
*B60P 3/00* (2006.01)
*G06Q 99/00* (2006.01)

(52) U.S. Cl.
CPC ............... *B67D 7/02* (2013.01); *B60P 3/007* (2013.01); *B67D 7/78* (2013.01); *G06Q 99/00* (2013.01)

(58) Field of Classification Search
CPC ... B67D 7/02; B67D 7/78; B60P 3/007; B60P 3/246; B60P 3/2235; G06Q 99/00
USPC ........................................... 141/1, 95
See application file for complete search history.

(56) References Cited

U.S. PATENT DOCUMENTS

| | | | | |
|---|---|---|---|---|
| 2,024,908 A | * | 12/1935 | Blum | B29D 22/006 383/105 |
| 2,612,924 A | * | 10/1952 | Cunningham | B65D 88/1637 383/3 |
| 2,724,418 A | * | 11/1955 | Krupp | F16K 17/0486 220/565 |
| 2,969,102 A | * | 1/1961 | Cunningham | B66C 1/12 294/68.3 |
| 3,146,017 A | ‡ | 8/1964 | Yeary | B60P 3/00 296/186.2 |
| 3,222,099 A | ‡ | 12/1965 | Sven | B60P 3/426 296/10 |
| 3,282,361 A | ‡ | 11/1966 | Mackie | B65D 88/22 180/124 |
| 3,289,721 A | * | 12/1966 | Benson | B63B 35/285 220/666 |
| 4,152,796 A | * | 5/1979 | Fogel | A47C 27/087 5/682 |
| 4,167,795 A | * | 9/1979 | Lambert, Jr. | A47C 27/085 428/182 |

(Continued)

*Primary Examiner* — Kenneth Rinehart
*Assistant Examiner* — James R Hakomaki
(74) *Attorney, Agent, or Firm* — Fay Sharpe LLP

(57) ABSTRACT

An improved apparatus, system, and method of transporting a fluid product such as milk or juice is provided. A flexible tank or bladder is used to temporarily store the raw milk or juice and/or facilitate handling of the milk/juice between the supplier (e.g., farm), processing/bottling facility, and retail facility or storage facility.

6 Claims, 19 Drawing Sheets

(56) References Cited

U.S. PATENT DOCUMENTS

| | | | | |
|---|---|---|---|---|
| 4,208,748 A * | 6/1980 | Lobach | A47C 27/085 | 5/682 |
| 4,457,456 A * | 7/1984 | Derby | B65D 88/1618 | 383/17 |
| 4,493,109 A * | 1/1985 | Nattrass | B65D 88/1612 | 383/7 |
| 4,574,986 A ‡ | 3/1986 | Baris | B65D 90/048 | 105/358 |
| 4,875,596 A * | 10/1989 | Lohse | B65D 90/046 | 220/1.6 |
| 5,044,030 A * | 9/1991 | Balaton | A47C 27/087 | 5/710 |
| 5,188,460 A * | 2/1993 | Dorse | B65D 90/048 | 383/125 |
| 5,402,732 A * | 4/1995 | Erickson | B61D 5/02 | 222/105 |
| 5,412,822 A * | 5/1995 | Kelly | A47C 4/54 | 5/654 |
| 5,666,493 A ‡ | 9/1997 | Wojcik | G06Q 10/087 | 705/22 |
| 5,824,995 A * | 10/1998 | Wise | B65D 90/048 | 219/393 |
| 6,015,055 A ‡ | 1/2000 | Bonerb | B60P 3/426 | 220/1.5 |
| 6,192,633 B1 * | 2/2001 | Hilbert | E04H 1/1277 | 52/2.18 |
| 6,250,488 B1 * | 6/2001 | Narahara | B65D 90/046 | 220/1.6 |
| 6,446,680 B1 ‡ | 9/2002 | Soehnlen | A23C 9/1516 | 141/100 |
| 6,467,955 B1 * | 10/2002 | Kim | B65D 88/1612 | 383/105 |
| 6,588,028 B1 * | 7/2003 | Wu | E04H 4/0025 | 4/506 |
| 6,591,986 B2 ‡ | 7/2003 | Soehnlen | B65D 1/20 | 206/434 |
| 6,913,028 B2 * | 7/2005 | Morioka | B65D 90/205 | 134/76 |
| 7,243,382 B2 * | 7/2007 | Weedling | A61G 7/05769 | 5/703 |
| 7,340,785 B2 * | 3/2008 | Weedling | A61G 7/1028 | 5/81.1 R |
| 7,581,772 B2 * | 9/2009 | Johnson | B65D 33/065 | 294/149 |
| 7,717,296 B1 * | 5/2010 | Guthrie | B65D 88/22 | 222/105 |
| 8,100,614 B2 ‡ | 1/2012 | Jerich | B62D 53/067 | 410/2 |
| 8,562,214 B2 * | 10/2013 | Dozier | B60P 7/0876 | 383/108 |
| 8,894,281 B2 * | 11/2014 | Town | B65D 88/1681 | 383/17 |
| 9,233,778 B2 ‡ | 1/2016 | Prince | B65D 71/70 | |
| 9,296,556 B2 * | 3/2016 | Townsend | B65D 90/0033 | |
| 2002/0148400 A1 * | 10/2002 | Eagles | B65D 88/16 | 114/256 |
| 2003/0235349 A1 * | 12/2003 | Ricahrdson, Jr. | B65D 88/1625 | 383/119 |
| 2007/0009185 A1 * | 1/2007 | Lee | A61G 17/06 | 383/18 |
| 2007/0095696 A1 ‡ | 5/2007 | Soehnlen | B65D 21/0209 | 206/434 |
| 2007/0271876 A1 ‡ | 11/2007 | Davies | B65B 5/10 | 53/443 |
| 2008/0194160 A1 * | 8/2008 | Concannon | B63B 22/166 | 441/21 |
| 2010/0310711 A1 ‡ | 12/2010 | Kendell | A23C 3/04 | 426/2 |
| 2011/0238457 A1 ‡ | 9/2011 | Mason | G06Q 10/063112 | 705/7.14 |
| 2012/0016814 A1 ‡ | 1/2012 | Evans | G06Q 99/00 | 705/500 |
| 2014/0301669 A1 * | 10/2014 | Baeck | B65D 90/32 | 53/469 |
| 2016/0104111 A1 ‡ | 4/2016 | Jones | G06Q 10/08345 | 705/26.4 |
| 2016/0355332 A1 ‡ | 12/2016 | Scudder | B65D 90/52 | |

\* cited by examiner
‡ imported from a related application

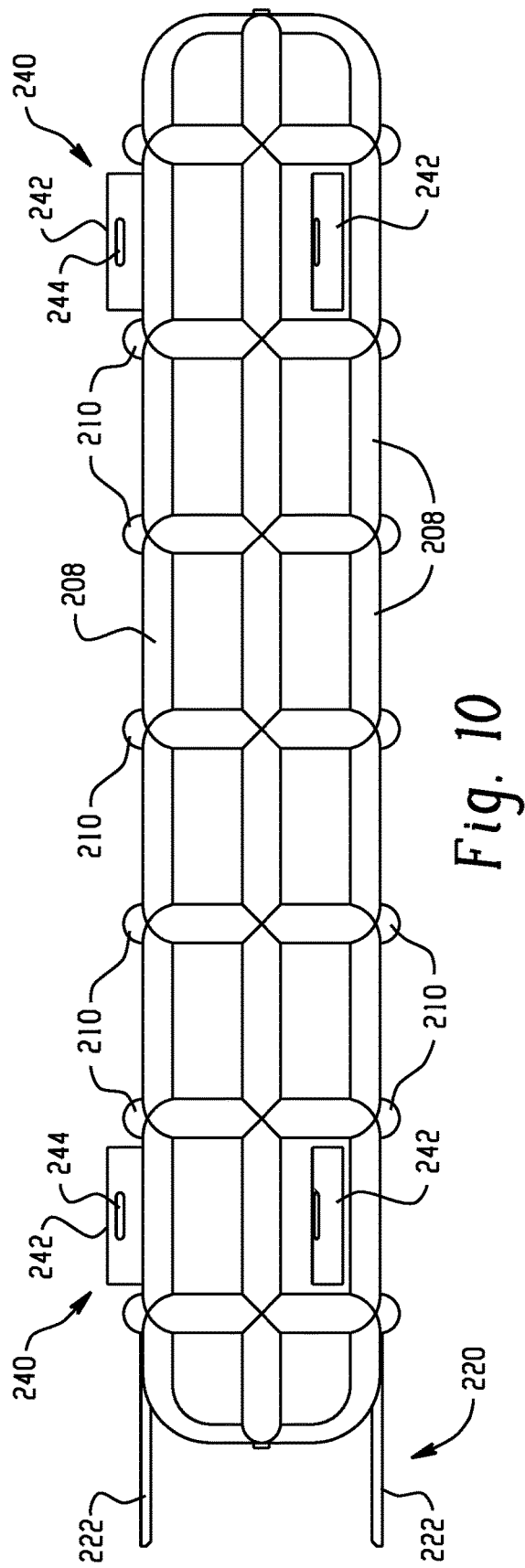
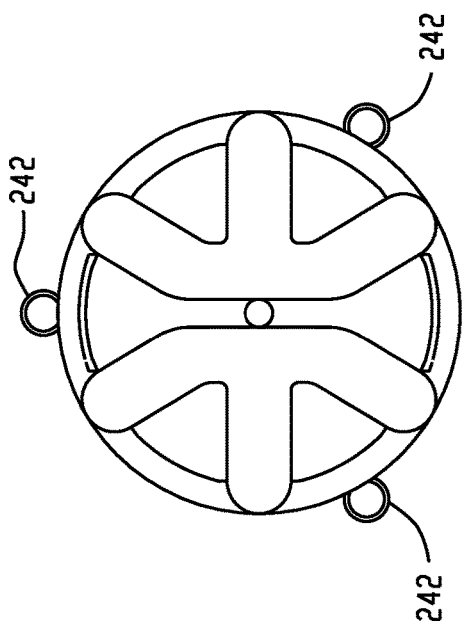
Fig. 10
Fig. 11

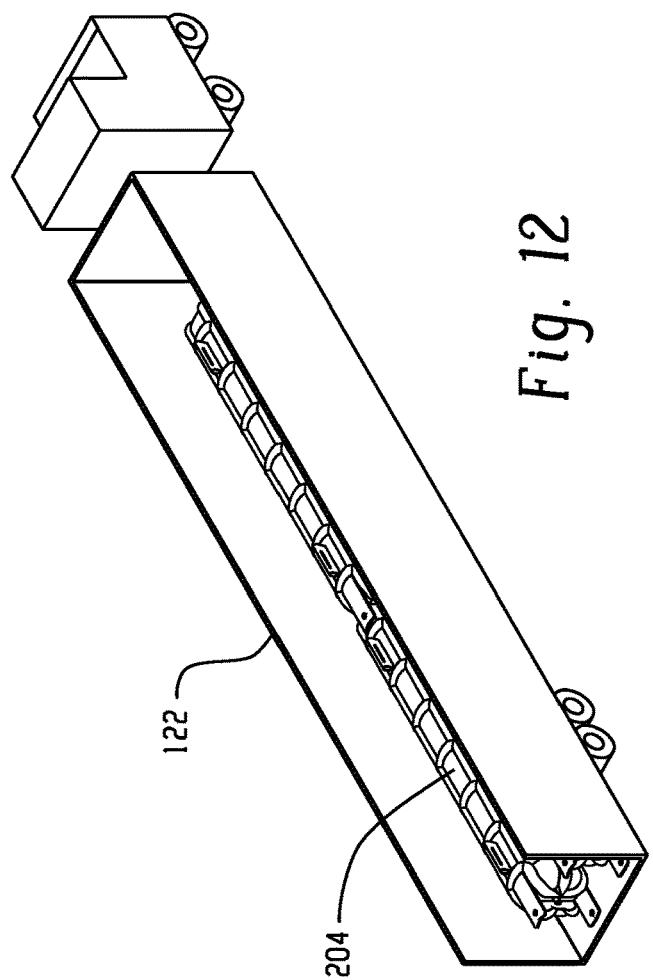
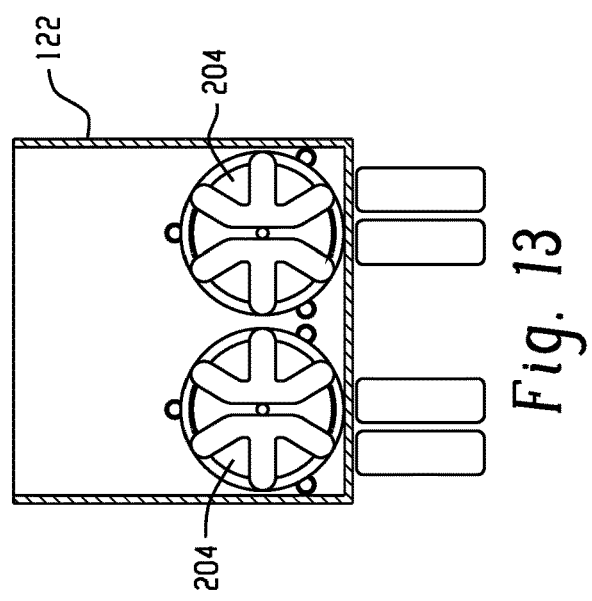
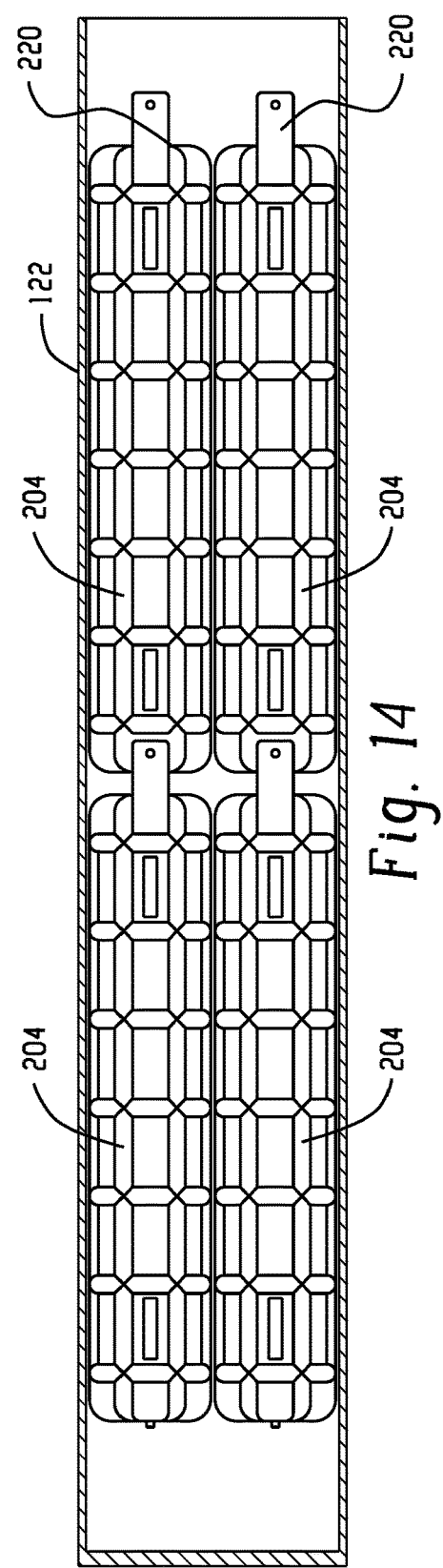
Fig. 12
Fig. 13
Fig. 14

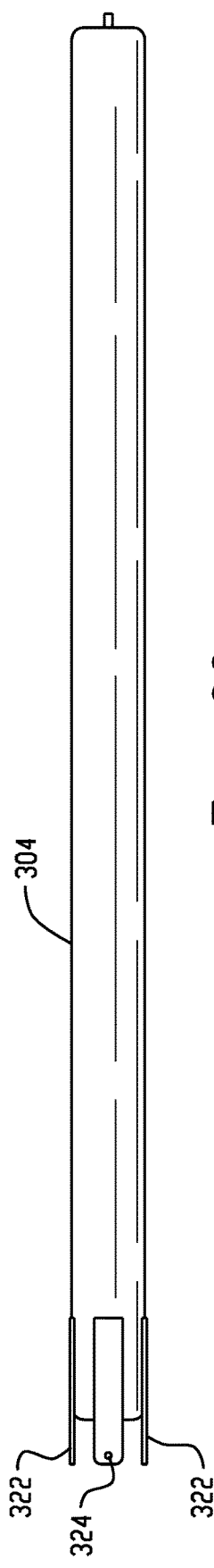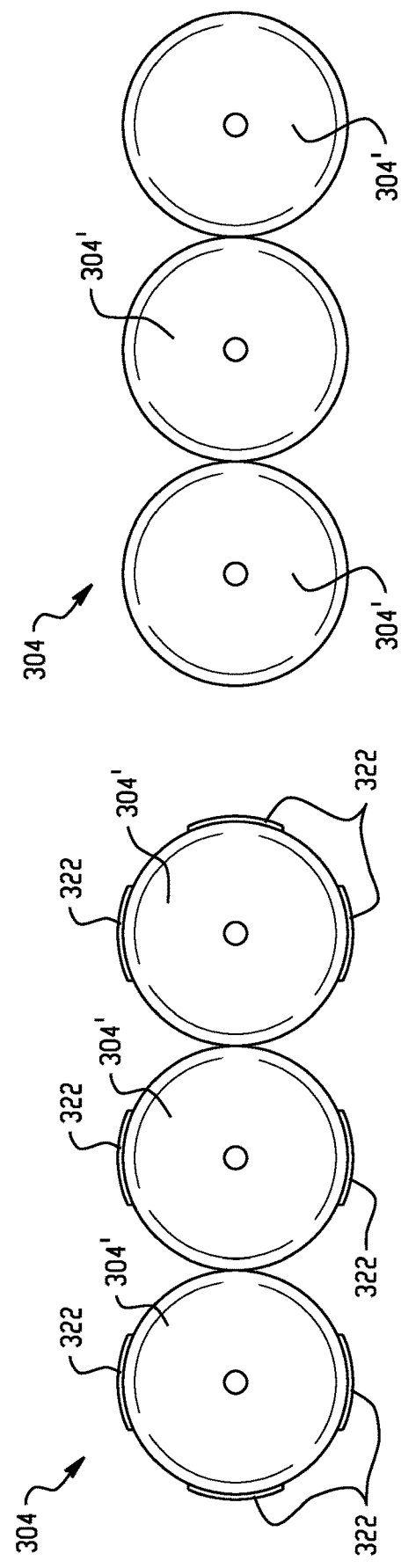
Fig. 22
Fig. 24
Fig. 23

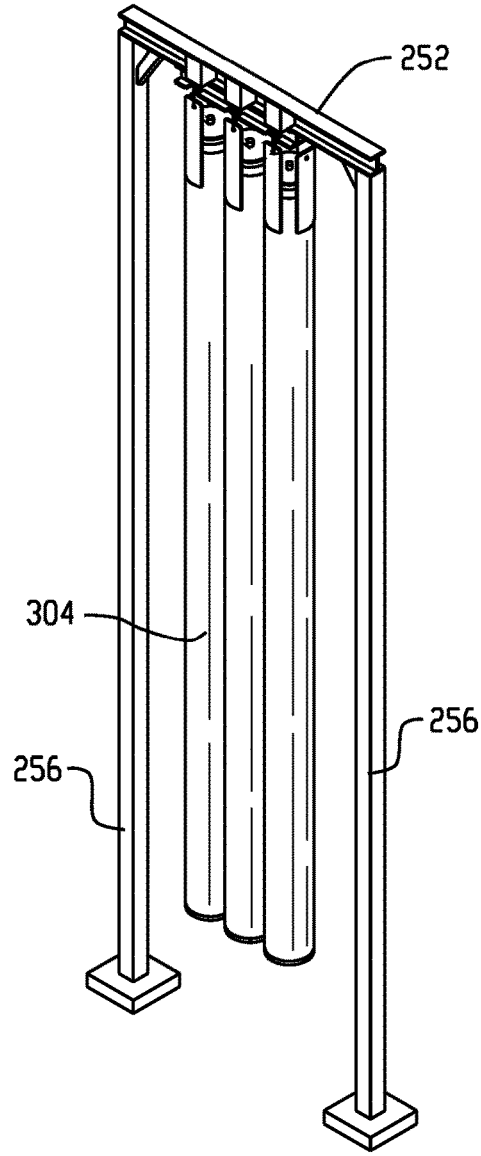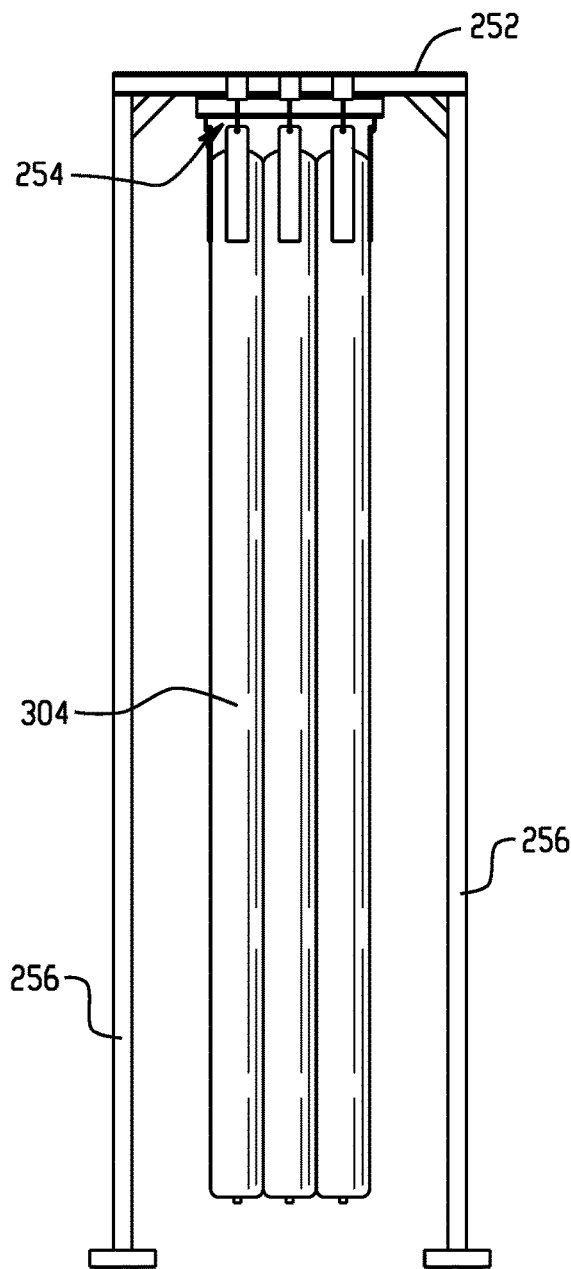
Fig. 27
Fig. 28

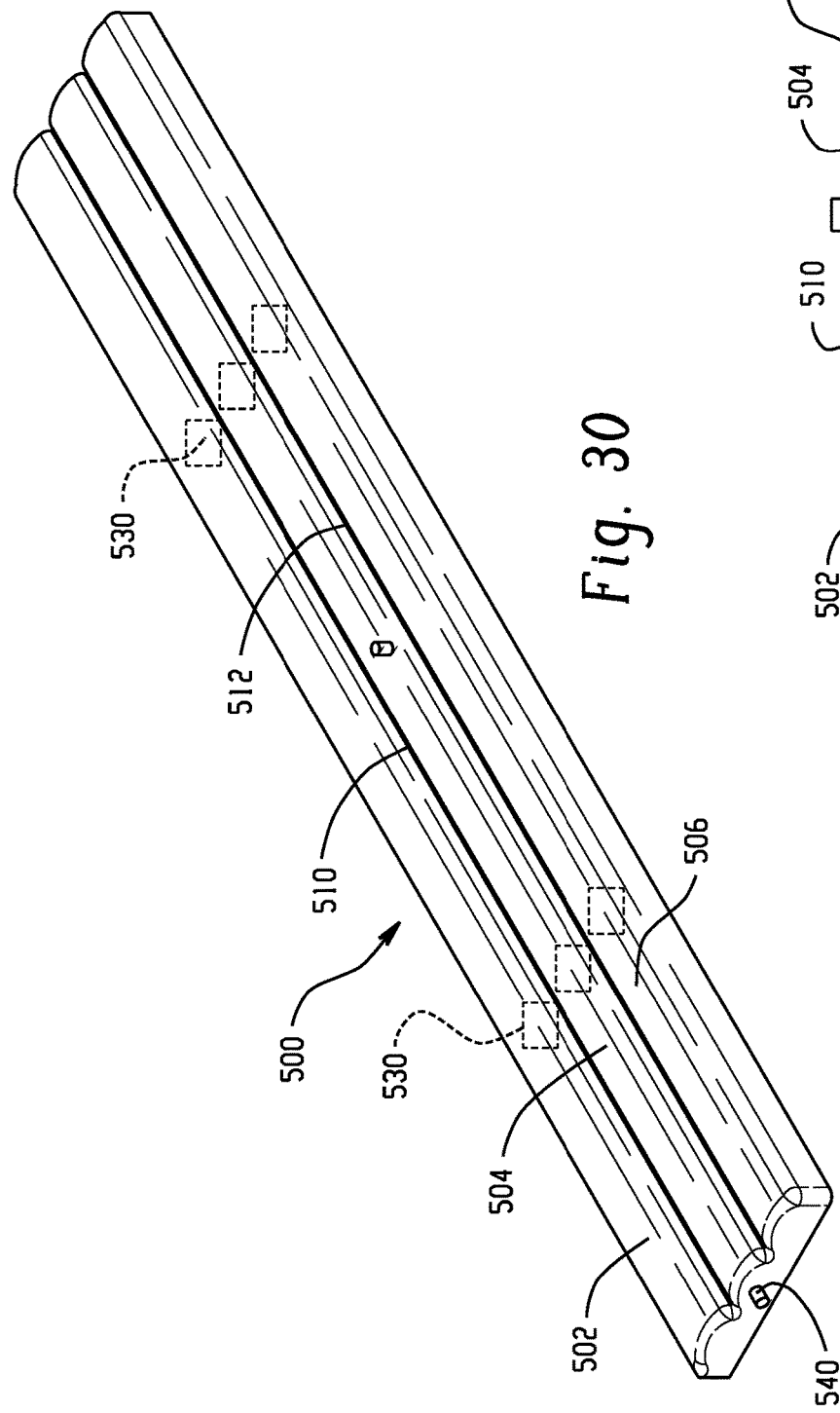
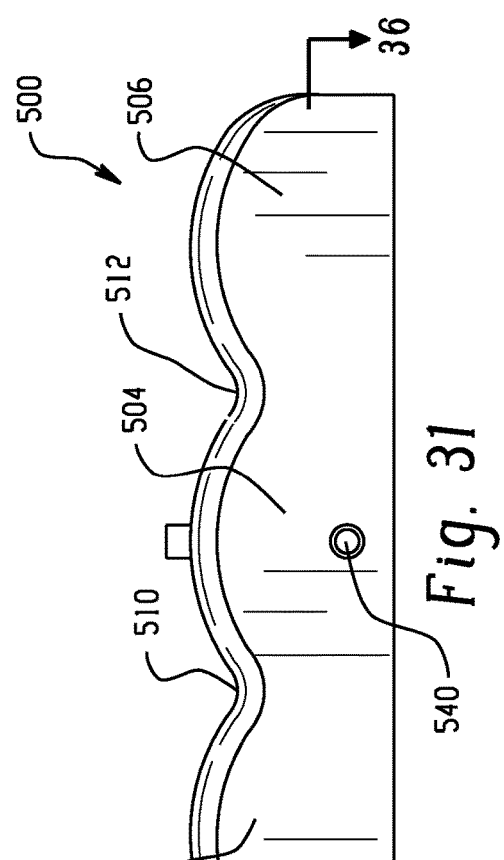

APPARATUS, SYSTEM, AND METHOD OF TRANSPORTING FLUID PRODUCTS

This application is a continuation application of U.S. application Ser. No. 15/360,320, filed Nov. 23, 2016 claiming the priority benefit of provisional application Ser. No. 62/259,965, filed Nov. 25, 2015, the entire disclosures of which are expressly incorporated herein by reference.

BACKGROUND

The present disclosure relates to an apparatus, a system using the apparatus, and a method of transporting fluid products. It finds particular application in conjunction with fluid food products such as milk (for example, raw milk, soy milk, almond milk, BHT and non-BHT milk, organic milk, etc.) or milk product, juice, etc., and will be described with particular reference thereto. However, it is to be appreciated that the present exemplary embodiment is also amenable to other like applications such as cheese, soy, corn syrup, sucrose, sour cream, salad dressing, ice cream, etc.

A typical processing/bottling facility (also referred to as a dairy) receives fluid food product such as raw milk from a supplier or farm in a vehicle such as a customized tanker, for example a stainless or other food grade material, that temporarily stores raw milk pickup at the farm and transported to the dairy. For example, once the cows have been milked, the raw milk is stored in food grade containers or storage tanks at the farm where it is maintained at a desired temperature. Periodically, the customized tanker drives to the farm, pumps the stored milk from the farm storage tank into the customized tanker, and then transports the raw milk to the dairy. At the dairy, the raw milk is pumped from the customized tanker into a storage silo on-site at the dairy where the raw milk is further processed (e.g., into different types of milk, cheese, ice cream, sour cream, —sometimes generally referred to as dairy products, etc.).

The interior storage chamber of the customized tanker is cleaned once the raw milk has been pumped into the storage silo at the dairy. The customized tanker is then routed for another pick-up of raw milk from a farm, and delivery of raw milk to the dairy. Generally, the return trip from the dairy to the farm has an empty storage chamber on the customized tanker. Whether the customized tanker leaves directly from the dairy, or is dispatched from a truck depot directly to the farm, at least a portion of one leg of the trip has a customized tanker that is empty of milk.

The storage silo can hold or store a substantial amount of raw milk associated with multiple deliveries from different customized tankers. The dairy or processing facility then accesses the raw milk stored in the silo as needed for processing (e.g. pasteurizing) and bottling. Once the milk has been bottled, the bottled milk is shipped to one or more retail facilities or outlets (e.g., stores, storage facilities, etc.). As will be appreciated, the customized tanker does not transport bottled milk to the retail outlet. Instead, different types of refrigerated trucks and/or trailers different than the customized tanker are used. In many instances, whether the bottled milk be from a conventional dairy or from a caseless dairy of the type shown and described in commonly owned U.S. Pat. Nos. 6,068,161 and 6,591,986 (the disclosures of which are expressly incorporated herein by reference), the bottled milk is commonly transported in a refrigerated trailer of a tractor-trailer vehicle. From the dairy to the retail facility, the trailer is filled with bottled milk. On a return trip from the retail to the dairy, the trailer may be filled with empty cases (if the trailer delivered bottled milk from a conventional dairy), or the trailer may be empty, or partially empty. Again, as will be appreciated by one skilled in the art, at least a part of a trip or leg of a trip (between farm and dairy, or between dairy and retail facility) has an empty or partially empty storage cavity. Further, there is additional cost associated with the manufacture of a customized tanker, there is an additional cost associated with washing and cleaning a customized tanker, and there is an extra cost associated with a dedicated, specialized truck or vehicle (i.e., it handles one type of product at a time) used for only a part of this overall transport system.

It is estimated that approximately $0.05-$0.10 per gallon of the cost of a gallon of bottled milk is associated with transportation costs. Consequently, better use of the transportation and control of the transportation costs can have a significant impact on the final price of bottled milk.

Likewise, the silos at the dairy are typically dedicated to storing the raw milk (e.g., organic, BHT, non-BHT) or milk product (e.g. soy, almond). The same is true of storing raw milk or milk products at the farm. This can result in under-utilization of storage capacity, as well as additional costs associated with switching from storage of one product to storing another type of product (e.g., storing BHT and subsequently storing non-BHT milk).

A need exists for an improved apparatus, system, and method of transporting fluid food product such as milk or juice.

BRIEF DESCRIPTION

The method of handling fluid food product or milk includes delivering bottled milk from a dairy (processing facility or bottling facility) in a vehicle on a first leg of a trip toward a retail facility. The method further includes picking up raw milk from a dairy farm (or a fluid food product, or unpasteurized milk product, different type of milk, soy, juice, etc.) in the vehicle on a second leg of a trip toward the dairy or processing/bottling facility.

The picking up step includes transferring milk at the dairy farm to the vehicle.

The transferring step includes filling a storage chamber for return to the dairy or processing/bottling facility.

The picking up step includes filling a chamber on the vehicle with unpasteurized milk at the dairy farm.

The chamber filling step includes providing a flexible walled, expansible chamber for receiving the raw milk.

The expansible chamber has a minimized dimension during a delivery step of the first leg toward the retail facility, and has a larger dimension on at least a portion of the second leg of the trip toward the dairy or processing/bottling facility.

The picking up step includes filling a chamber on the vehicle with raw milk from a dairy farm.

The chamber filling step includes filling a flexible walled, expansible chamber with raw milk.

The chamber filling step includes introducing raw milk into discrete, multiple chambers.

The multiple chambers are removable from the vehicle in one embodiment.

The fluid food product is one of unpasteurized dairy product or juice.

The unpasteurized dairy product is one of soy milk, almond milk, BHT milk, non-BHT milk, or organic milk.

The transferring step includes loading a filled storage chamber from the dairy farm on to the vehicle.

The method includes unloading the filled storage chamber from the vehicle at the dairy.

Method includes dispensing unpasteurized milk from the filled storage chamber at the dairy.

Method includes cleaning an empty storage chamber after the dispensing step at the dairy.

Separate, discrete expansible chambers may store different types or kinds of fluid food products.

A vehicle is modified to with an expansible storage chamber for receiving fluid product for a return trip to the dairy or processing/bottling facility.

The expansible storage chamber may be formed in a floor portion of the vehicle.

The expansible storage chamber in one embodiment includes one or more expansible bladders that receive the fluid product.

In another embodiment, the expansible storage chamber includes removable expansible bladders that may be filled at the farm with raw milk, or picked up as filled chambers that are transferred to the vehicle for the return trip.

The expansible storage chamber is emptied of its content (e.g., raw milk) at the dairy or processing/bottling facility.

The expansible storage chamber may be used as a dispensing silo at the dairy.

The expansible storage chamber is capable of being suspended at the dairy for gravity removal of the fluid product.

An improved apparatus provides for a useful return trip of a vehicle from the dairy farm, where the same vehicle can be used for other purposes before arriving at the farm.

Overall cost of transportation is reduced, and likewise the cost of the final bottled fluid product is reduced as a result of implementing the apparatus, system and/or method of the present disclosure.

Still other benefits and advantages will become more apparent to those skilled in the art upon reading and understanding the following detailed description.

BRIEF DESCRIPTION OF THE DRAWINGS

FIG. 10 is an elevational view of the expansible chamber of FIG. 9.

FIG. 11 is an end view taken generally from the right-hand side of FIG. 10.

FIG. 12 is a perspective view of multiple expansible chambers of the type shown in FIG. 9 in a trailer.

FIG. 13 is an end view taken from the rear of the trailer of FIG. 12.

FIG. 14 is an overhead plan view of the expansible chambers in the trailer of FIG. 12.

FIG. 22 is a front elevational view of the expansible chamber of FIG. 21.

FIG. 23 is an end view taken generally from the left-hand side of FIG. 22.

FIG. 24 is an end view taken generally from the right-hand side of FIG. 21.

FIG. 27 is a perspective view of the expansible chamber such as shown in FIG. 21 removed from the trailer, and that is lifted and hung from a support structure.

FIG. 28 is a front elevational view of the expansible chamber and support structure of FIG. 27.

FIG. 30 is a perspective view of another embodiment of a bladder tank.

FIG. 31 is an end view of the bladder tank of FIG. 30.

DETAILED DESCRIPTION

Figure 1:
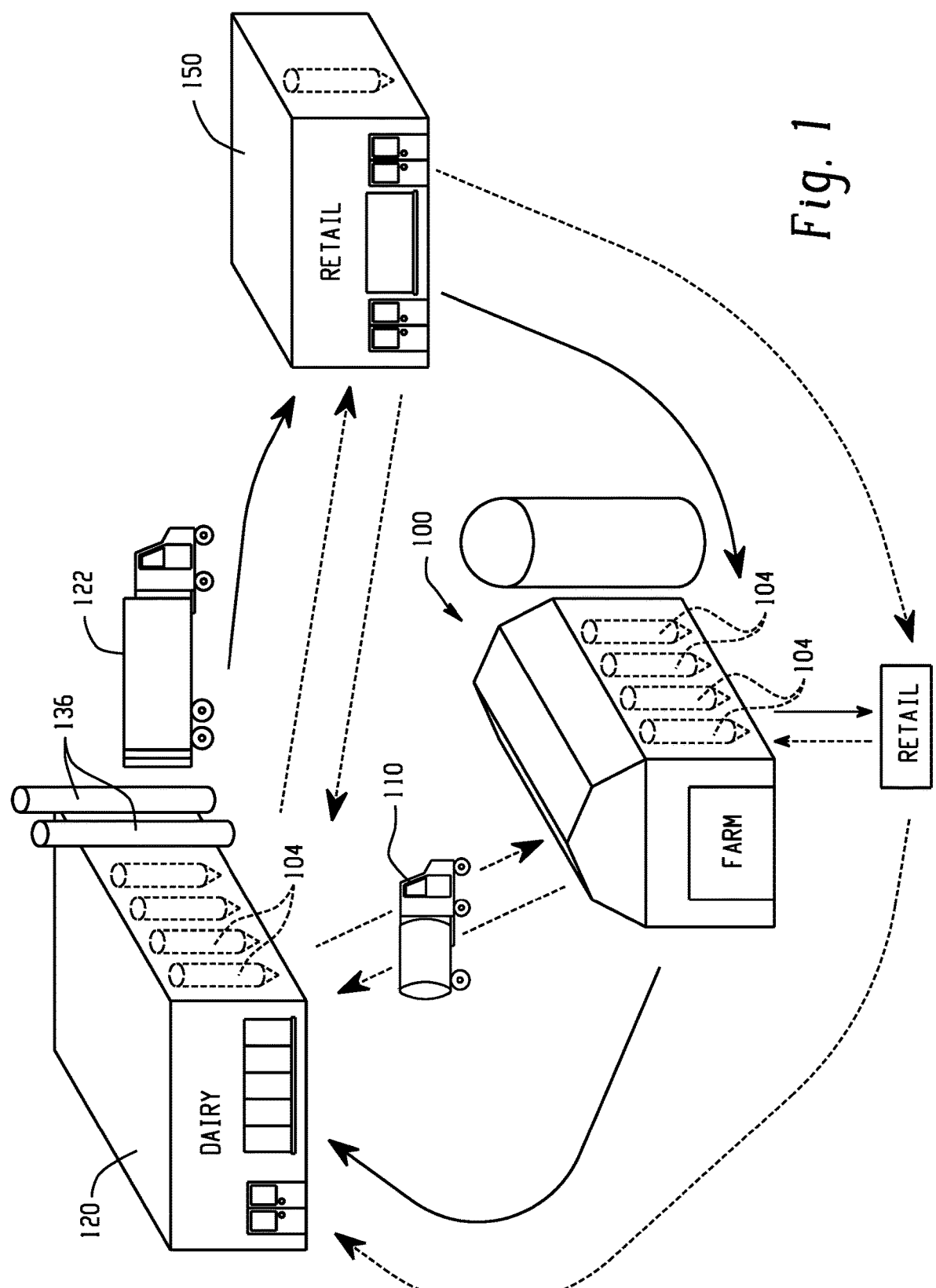
FIG. 1 is a schematic illustration of the present disclosure.
Figure 2:
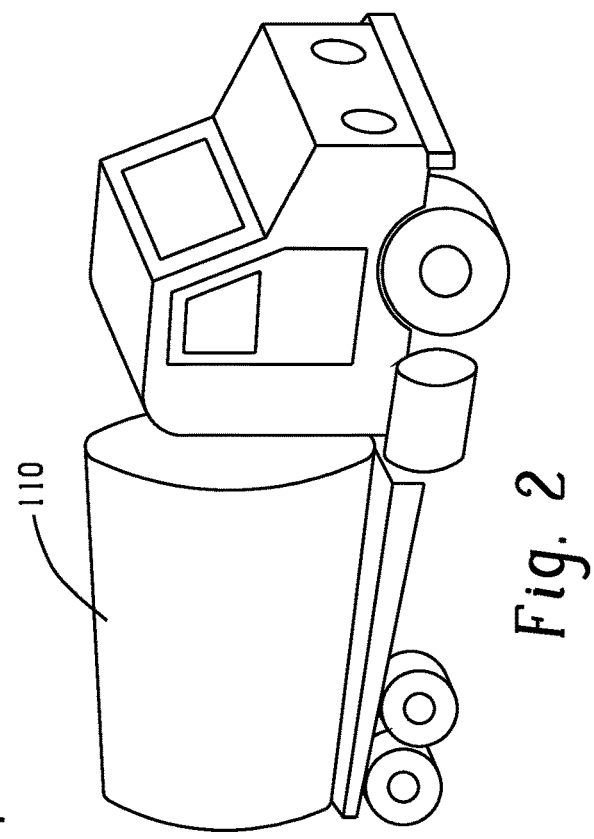
FIG. 2 shows the specialized truck for hauling fluid food product, such as raw milk.

FIG. 1 schematically illustrates the interaction between the dairy, retail, and farm of the present disclosure. Of course selected concepts are fully applicable to other sources of fluid food product other than fluid dairy product from a farm (e.g., soy, juice, corn syrup, sucrose, salad dressing, sour cream, etc.). Raw or unpasteurized milk (where raw milk will sometimes refer to a "fluid food product" or "unpasteurized milk product", e.g., milk, different types of milk, almond milk, soy milk, or juice) is available from a supplier or source such as farm 100. Typically, storage tanks such as temperature controlled tanks 104 contain and temporarily store the raw milk therein until a specialized vehicle, such as a raw milk tanker 110 (FIG. 2) receives the raw milk from the storage tanks of the farm 100 and transports the raw milk to a processing/bottling facility such as dairy 120. By way of example only, the specialized fluid transport vehicle 110 may hold approximately 6000 gallons of fluid and depending on the size of the farm(s) thus may visit one or more farms before returning to a dairy 120. The vehicle 110 may be issued from a truck depot or dairy, but during at least one leg of the trip, the vehicle is either empty or partially empty, i.e., when it leaves a truck depot or leaves the dairy 120 to pick up raw milk from one or more farms 100. As will become apparent below, the specialized vehicle 110 may still be used as a part of the new transport system, or may be eliminated entirely through use of a conventional or modified trailer.

Figure 3:
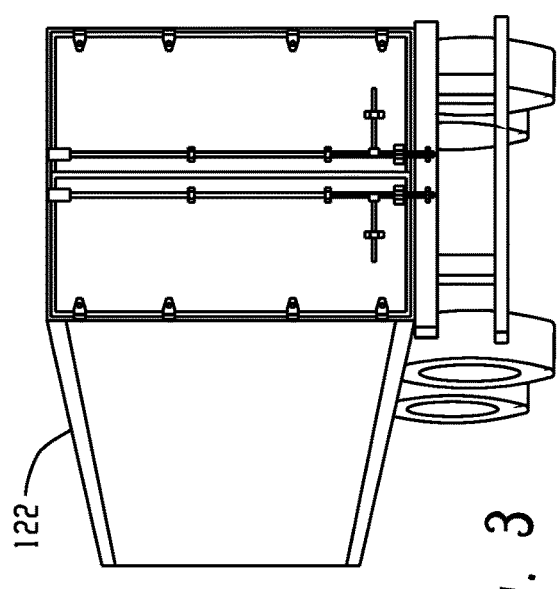
FIG. 3 shows a conventional trailer for hauling bottled fluid product, and also back hauling fluid product such as raw milk as taught by the present disclosure.
Figure 4:
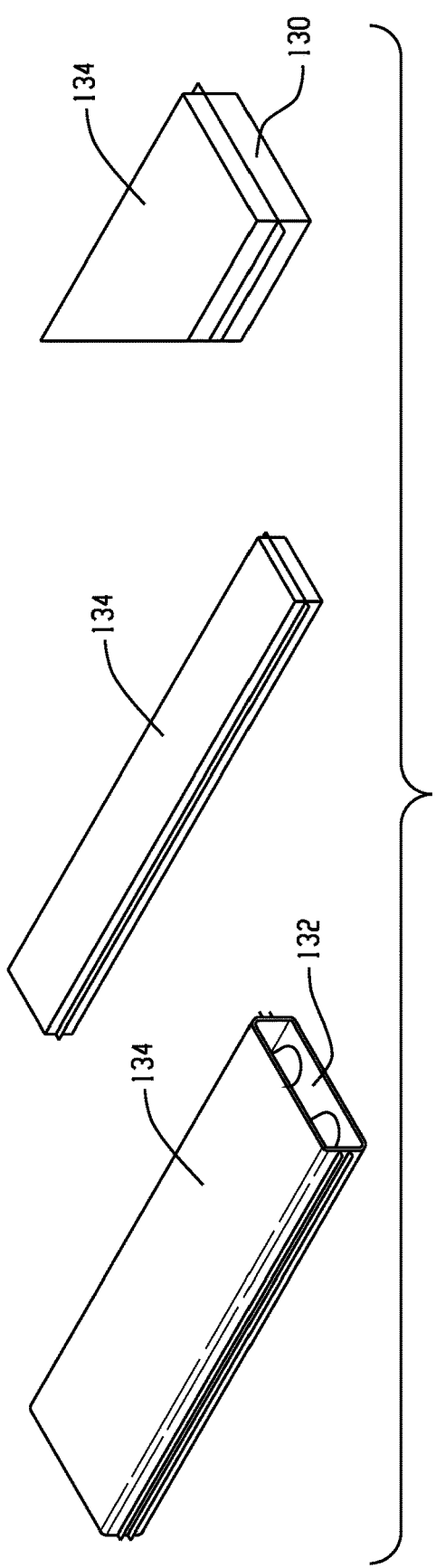
FIG. 4 illustrates incorporation of expansible chamber(s) to the floor of the trailer.

In the schematic of FIG. 1, the storage tank 104 may be individual or joined expansible storage chambers 104, sometimes referred to herein as bladders or bladder tanks. Thus it is contemplated that the filled, individual storage chambers 104 may instead be loaded onto a vehicle such as a trailer 122 shown in FIG. 3. Alternatively, the fluid product such as raw milk may be transferred or pumped from the storage tanks 104 at the farm 100 and received in separate expansible chambers 130 incorporated into a hollow cavity 132 of a floor 134 of the trailer 122 (FIG. 4). As the milk is pumped into the expansible chamber 130, the floor 134 of the trailer 122 is raised a preselected height. Further, the expansible chamber 130 integrated in the floor of the trailer 122 may limit the amount of other products that may be received on the floor when the chamber(s) is(are) filled with fluid. The expansible chamber(s) may also incorporate baffles or other mechanisms to limit "sloshing" or movement of the fluid product during transport from the farm 100 to the dairy 120. When the trailer 122 reaches the dairy 120, the fluid product is removed or pumped out of the expansible chambers 130 (if incorporated in the floor structure as shown in FIG. 4), or from the expansible chambers 104 into one or more storage tanks or silos 136 at the processing/bottling facility or dairy.

Alternatively, the filled expansible chambers 104 that were previously suspended at the farm 100, may be removed from the farm and loaded onto a trailer 122 for transport to the dairy 120. The chambers 104 are then hung or suspended for use as storage tanks or silos 104 at the dairy 120 where gravity can be advantageously used to facilitate emptying the chambers. By way of example only, each expansible storage chamber or bladder may hold approximately 1500 gallons. Thus the trailer 122 is capable of conveying a large amount of fluid product such as raw milk from the farm to the dairy. In another arrangement, the chambers 104 may transported from the farm to the dairy in a filled state, emptied or pumped into the storage at the dairy (e.g., silos or chambers), and then returned in a collapsed condition (ultimately to the farm) from the dairy.

Once the trailer 122 has been emptied at the dairy 120, the trailer is now able to receive other product for shipment to retail. For example, in the above-described arrangement, product such as milk, juice, flavored water, cheese, sour cream, etc. (typically loaded on pallets for ease of handling) is loaded into the trailer 122 and leaves the dairy 120 for shipment to one or more retail sites or storage facilities/warehouses 150. Previously, the trailer 122 would travel back and forth between the dairy 120 and retail site 150. Occasionally the return haul (or at least a portion of the return haul) from the retail site 150 to the dairy 120 would result in an empty trailer 122 at an associated cost. However, the trailer 122 that is modified with expansible chambers in the floor (such as in FIG. 4), or with collapsed expansible storage chambers 104, may now leave the retail site 150 and pick up fluid product for return to the dairy 120.

Again, by way of example, the trailer 122 can visit one or more farms 100. The collapsed, empty chambers 104 may be filled with milk from the farm 100, or the empty chambers may be swapped out for filled chambers from the farm 100 that are directly loaded into the trailer 122. Likewise, if desired, the expansible chambers 104 in the floor (FIG. 4) may be filled with raw milk at the farm 100 and return to the dairy 120.

Figure 5:
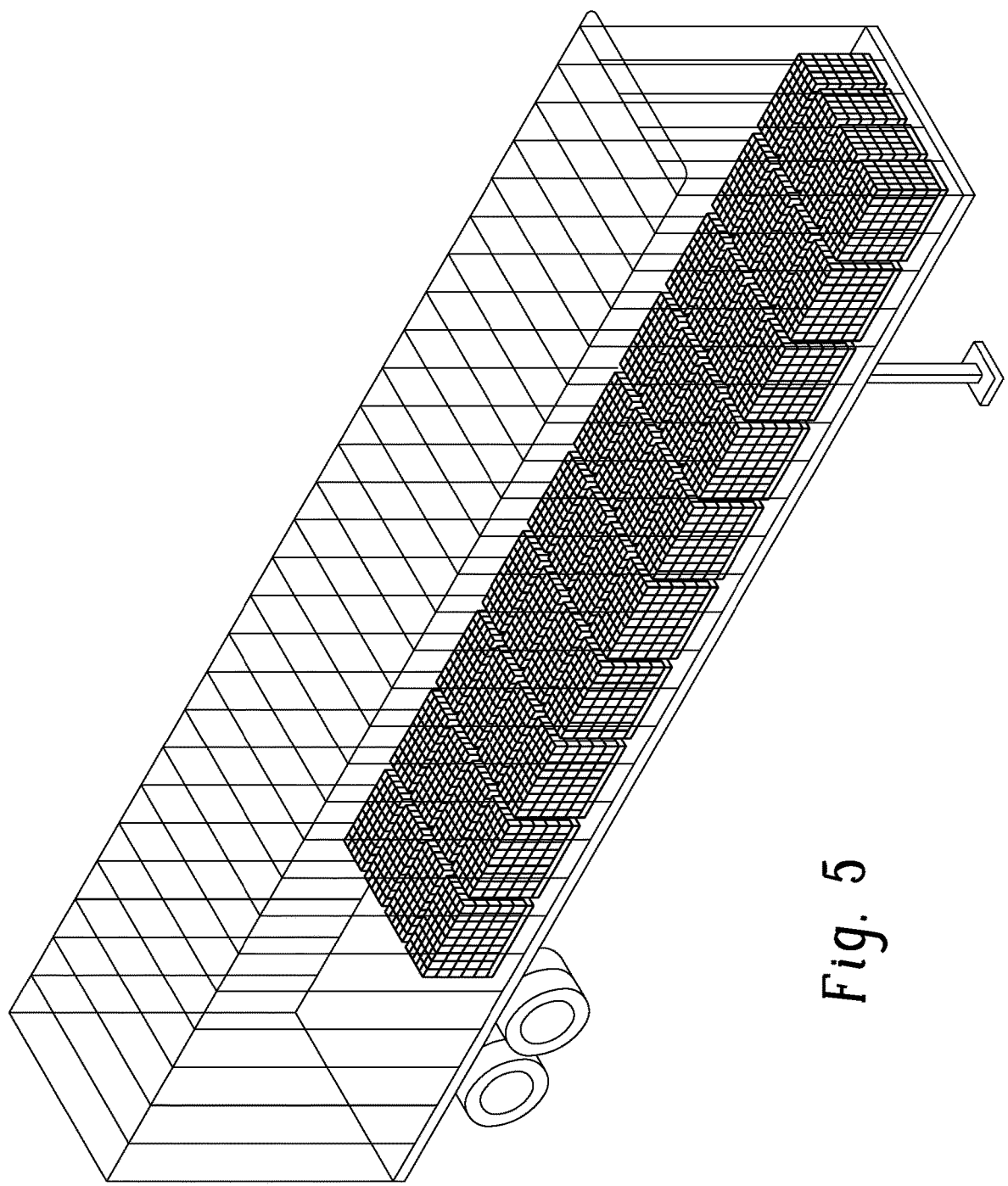
FIG. 5 illustrates the trailer stacked with palletized product (such as bottled milk).
Figure 6:
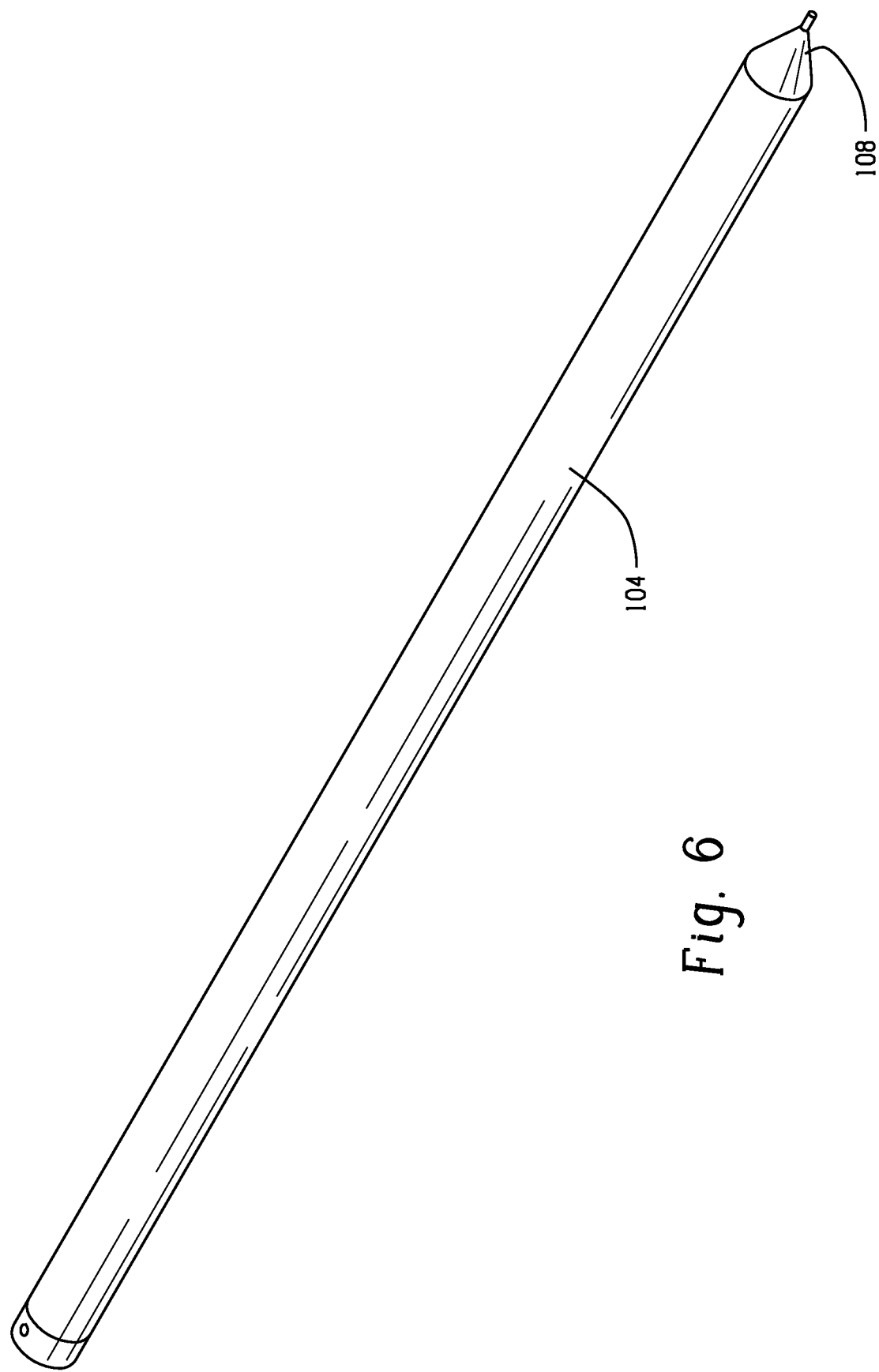
FIG. 6 illustrates one embodiment of an expansible storage chamber.

FIG. 5 illustrates how palletized product may be loaded into the trailer 122. FIG. 6 illustrates one form of an expansible storage chamber 104 that may be suspended from a first end 106 and fluid product dispensed from a second end 108. If the chamber 104 is suspended in an elongated, generally vertical orientation or arrangement, gravity feeds product to the second end 108. When empty, the expansible storage chamber 104 may be rolled up or collapsed in a manner similar to an empty firehose. It is also contemplated that the expansible storage chamber 104 may be handled by cable/pulleys, winch, a crane or other device (not shown) and lifted from the trailer 122 and suspended at the dairy 120. Likewise, the expansible storage chambers 104 may be stored in a suspended fashion at the farm 100 as illustrated in FIG. 1.

Figure 7:
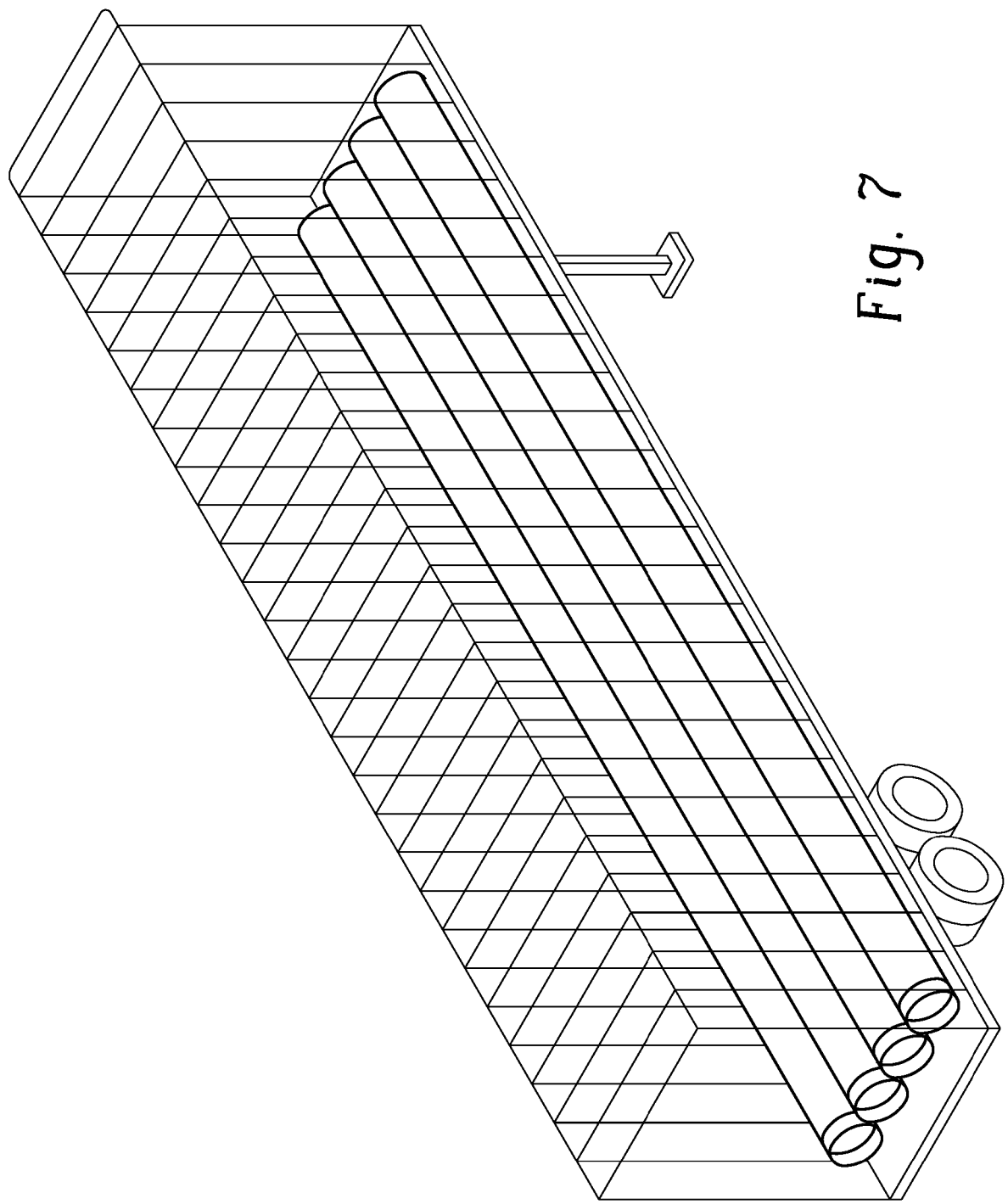
FIG. 7 shows how filled expansible storage chambers are received in a trailer.
Figure 8:
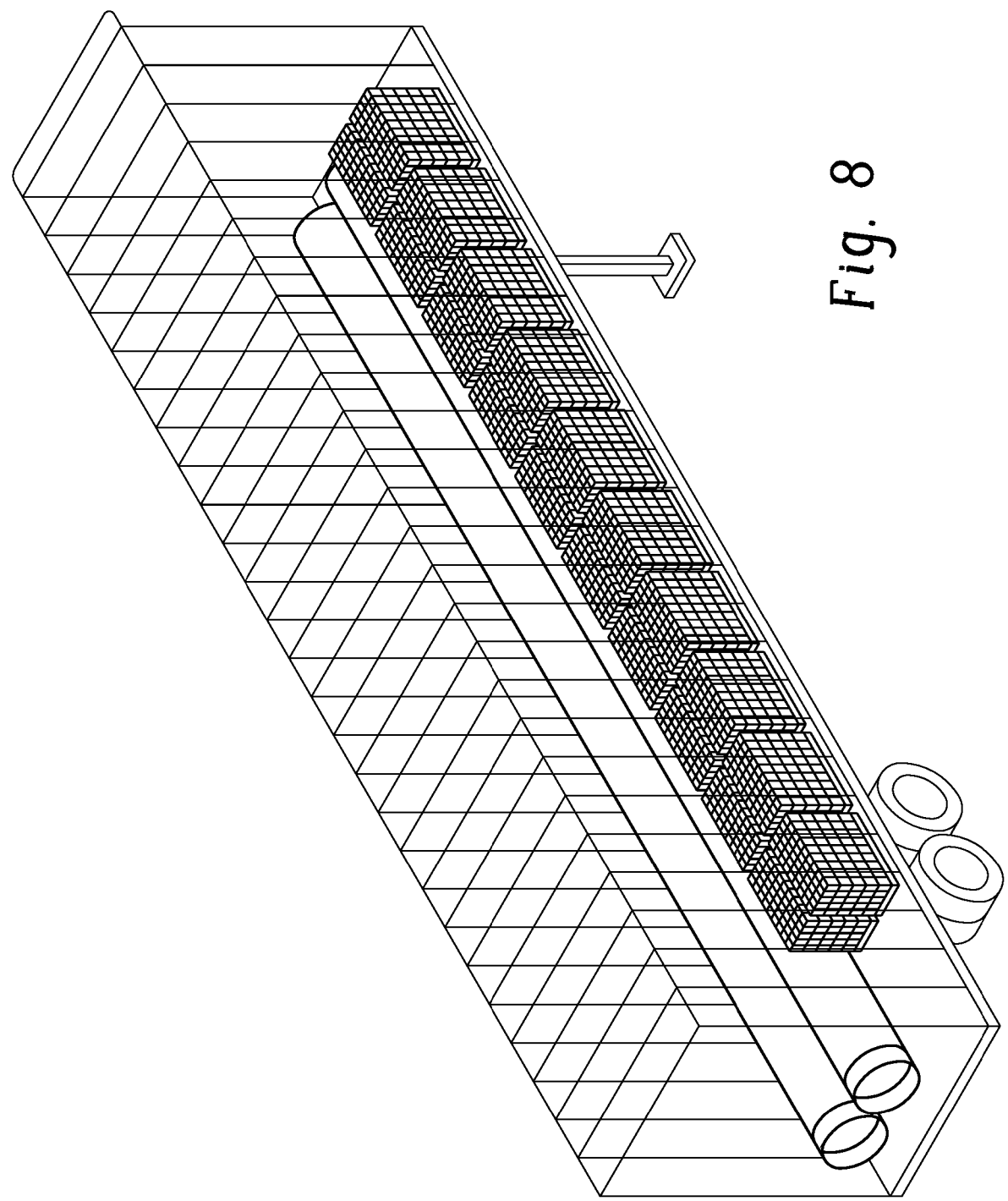
FIG. 8 illustrates a combination of filled storage chambers with palletized product in a trailer.

As shown in FIG. 7, if the palletized product is completely removed from the trailer 122, multiple storage chambers 104 may be received in the trailer. Alternatively, the trailer 122 may continue to be filled with palletized product in conjunction with the storage chambers 104. As a result, the return trip from the retail site 150 toward the dairy 120 may include additional stops at other retail sites (e.g. to drop off palletized or packaged product), pick up food fluid product from other sites such as a farm 100, subsequently deliver additional palletized product at another retail site, and subsequently receive additional fluid product from other farms. One can appreciate how the return leg from the retail site 150 toward the dairy 120 can be maximized to remove otherwise lost shipping costs. In addition, a conventional refrigerated trailer 122 can be easily modified for transporting raw milk from the farm 100 to the dairy 120 and, if desired, the same trailer used to transport product to and from one or more retail establishments, warehouses, etc., to maximize use of the trailer as an integrated part of the transport system.

Figure 9:
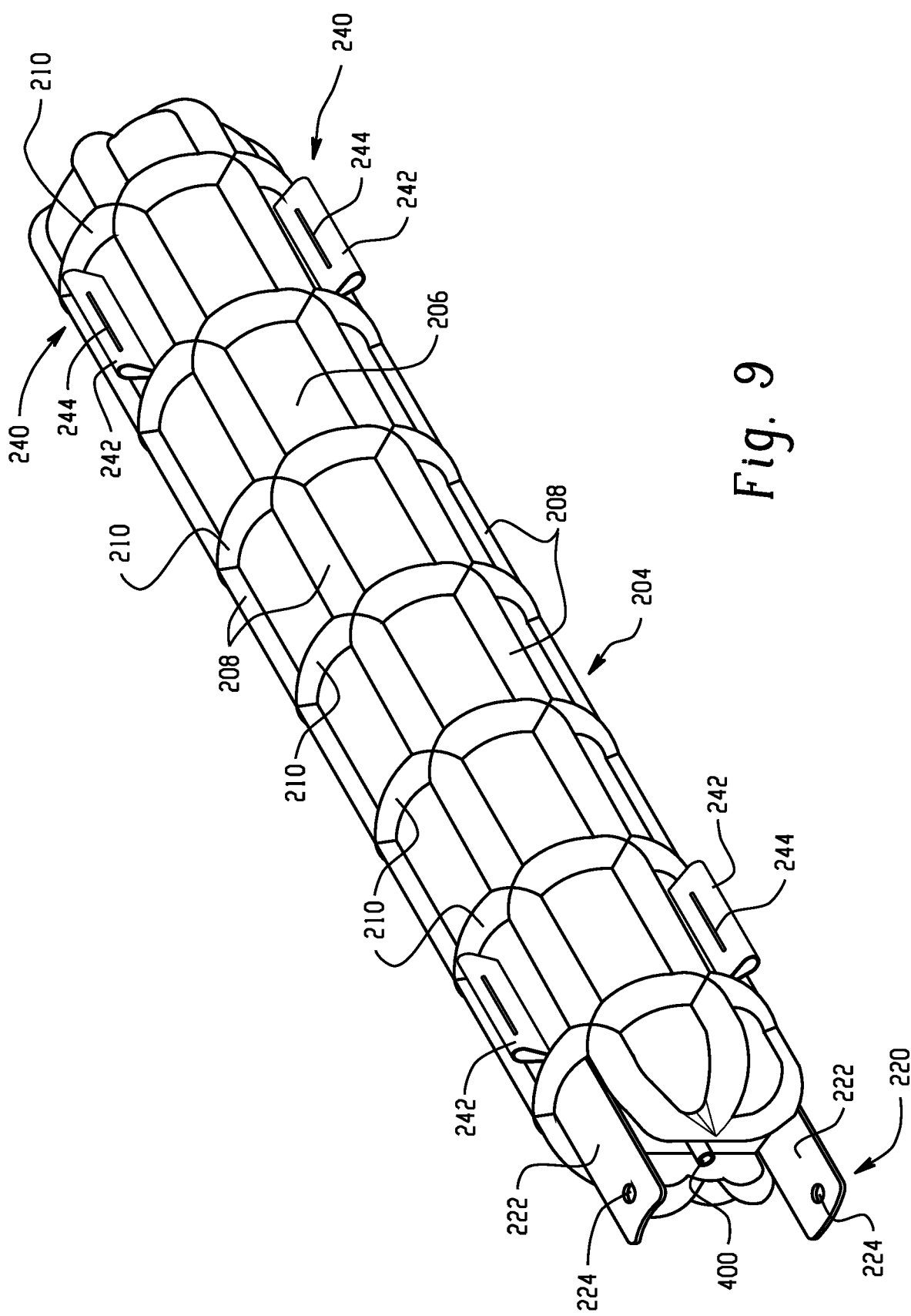
FIG. 9 is a perspective view of an alternative embodiment of an expansible chamber.

With continued reference to FIGS. 1-8, and additional reference to FIGS. 9-17, there is shown in FIGS. 9-11 a modified expansible chamber, tank, bladder 204. A flexible wall 206 and closes an internal cavity that is selectively filled/emptied of fluid product such as raw milk in the manner described above. The modified bladder tank 204 includes a series of longitudinal and circumferential air-filled ribs 208 (longitudinal), 210 (circumferential). Incorporating the air-filled ribs 208, 210 serve a twofold purpose. First, the ribs 208, 210 provide structural integrity or support so that the bladder tank 204 increases the internal volume of the cavity rather than allowing the flexible wall 206 to collapse and reduce the internal volume. This may be desirable once the fluid product has been removed from the internal cavity and wash or cleaning is desired/required. As will be appreciated, if the internal cavity of the bladder tank 204 is empty, the flexible wall 206 of the bladder tank without the ribs 208, 210 would collapse and the internal cavity may be more difficult to clean. In addition, the ribs 208, 210 serve a second purpose of limiting movement (e.g. longitudinal or rotational movement) of the bladder 204 when installed in the trailer 122. Using air-filled ribs 208, 210 allows these ribs to be selectively inflated and deflated if desired or necessary. The ribs 208, 210 may be filled with air, for example, and then the fluid product (e.g., milk) introduced into the bladder tank 204. The ribs 208, 210 preferably remain inflated during transport when one or more bladder tanks 204 are received in the trailer 122 (FIGS.

12-14). Once the milk has been removed from the bladder tank 204, air remains in the ribs 208, 210 to facilitate cleaning of the internal cavity as alluded to above. Thereafter, if desired, air can be removed from the ribs and the entire bladder tank 204 allowed to more fully collapse. For example, pressurized air would be readily available from a pressurized air container associated with a conventional tractor/trailer. Alternatively, the ribs 208, 210 can be designed so that the air is not selectively introduced or removed from the ribs.

In addition, a lifting mechanism 220 such as straps 222 may be provided at at least one end of the bladder tank 204. As shown in FIGS. 9-17, the straps 222 may include openings 224 to receive cables, hooks, etc. for moving/lifting/suspending a filled or unfilled bladder tank 204. Here, straps 222 are provided at one end of the bladder tank 204, and preferably the straps 222 extend beyond an end of the bladder tank 204. The straps 222 extend over and partially protect a fitting 400, such as a conventional sanitary connection fitting to be shown and described further below in connection with FIG. 29. Of course lifting straps 222 may adopt a different conformation or be provided at both ends of the bladder tank 204 without departing from the scope and intent of the present disclosure.

In addition, a connection arrangement 240 such as straps 242 may be provided at desired locations along the bladder tank 204. As shown in the figures, the individual connection straps 242 are located at opposite ends and circumferentially spaced, for example disposed approximately 120° apart as evident in FIG. 11. The particular number and location of the connection straps 242 is a matter of convenience for securing the bladder tank to the trailer 122 to limit relative movement of the bladder tanks relative to the trailer. For example, an elongated opening 244 is provided in each connection straps 242 for receipt of an associated hook, strap, or other securing mechanism (not shown). This further limits axial movement as well as rotation of the bladder tank 204 relative to the trailer when positioned therein. By way of example only, and as illustrated in FIGS. 12 and 14, four bladder tanks 204 are stored in an elongated trailer 122. Two of the bladder takes 204 are disposed in end-to-end relation and situated in side-by-side relation with an adjacent bladder tank, whereby four total bladder tanks are stored in the trailer 122. Of course a greater or lesser number of bladder tanks could be used, although it is contemplated that use of four bladder tanks 204, each housing approximately 1200 to 1250 gallons of milk, can be efficiently and effectively stored in the trailer 122 at a total weight of approximately 40,000 pounds.

Figure 15:
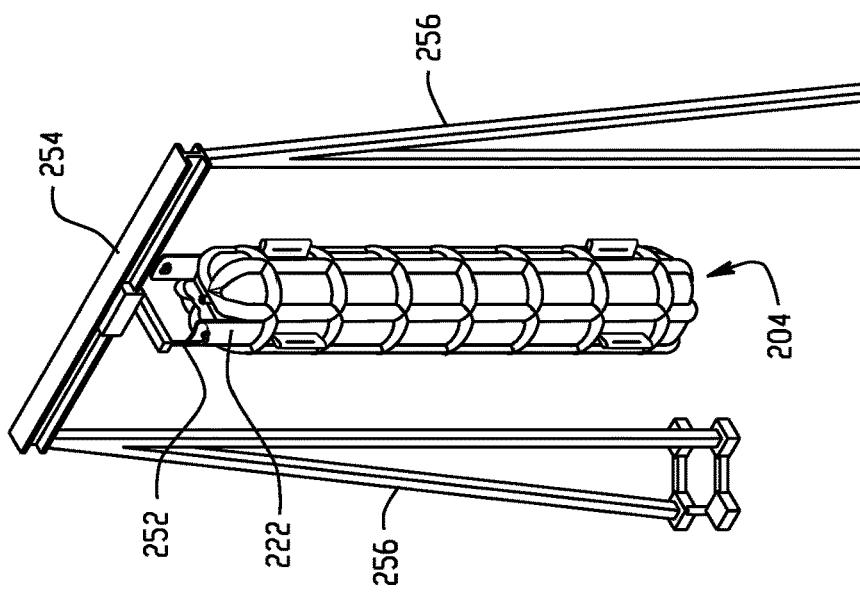
FIG. 15 is a perspective view of an expansible chamber such as shown in FIG. 9 removed from the trailer, and that is lifted and hung from a support structure.
Figure 16:
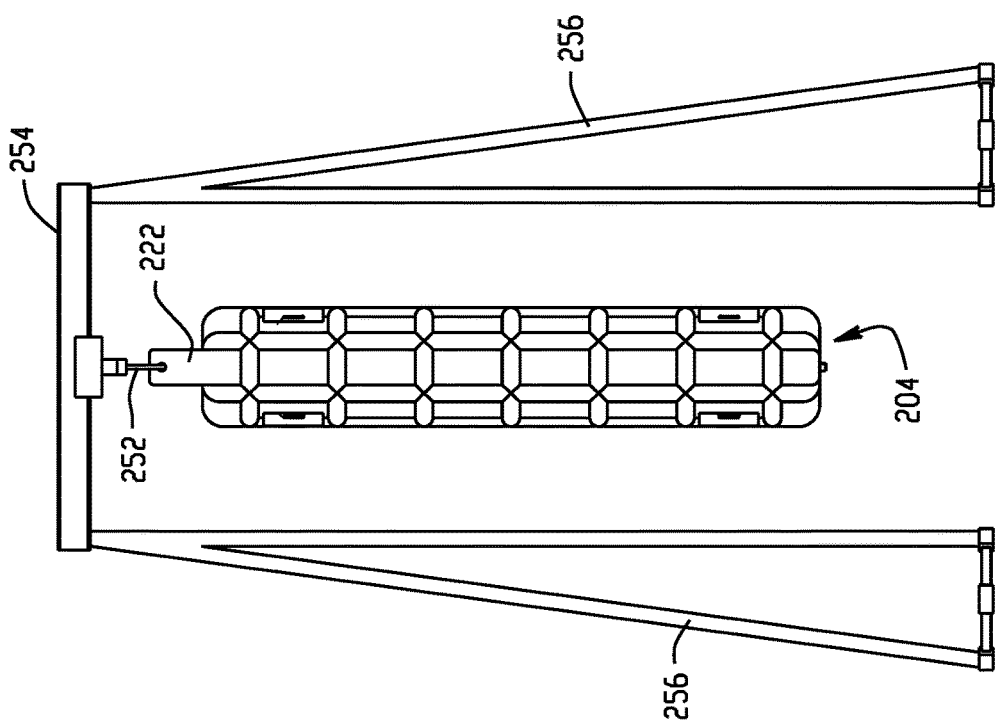
FIG. 16 is a front elevational view of the expansible chamber and support structure of FIG. 15.
Figure 17:
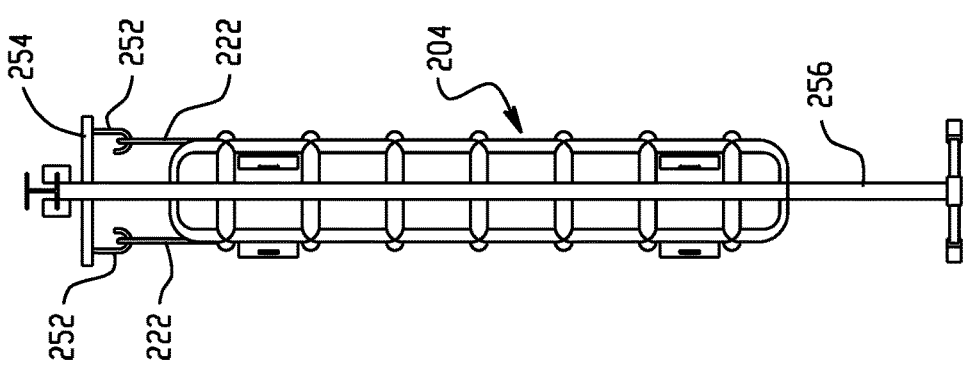
FIG. 17 is a side elevational view of the expansible chamber and support structure of FIG. 15.

As further shown in FIGS. 15-17, a bladder tank 204 may be vertically supported by a support structure 250. In this arrangement, individual hooks 252 extend from a cross bar 254 provided at an upper end of vertical support member 256. Each hook is dimensioned for receipt in an associated opening 224 of a lift strap 222. Vertically supporting the bladder tank 204 in this manner allows each bladder tank to be individually removed from the truck by virtue of the straps 222, and then lifted or hung in a vertical direction which allows the contents of the bladder tank 204 to drain, as well as the bladder tank cavity to be properly cleaned once the milk has been emptied therefrom.

Figure 18:
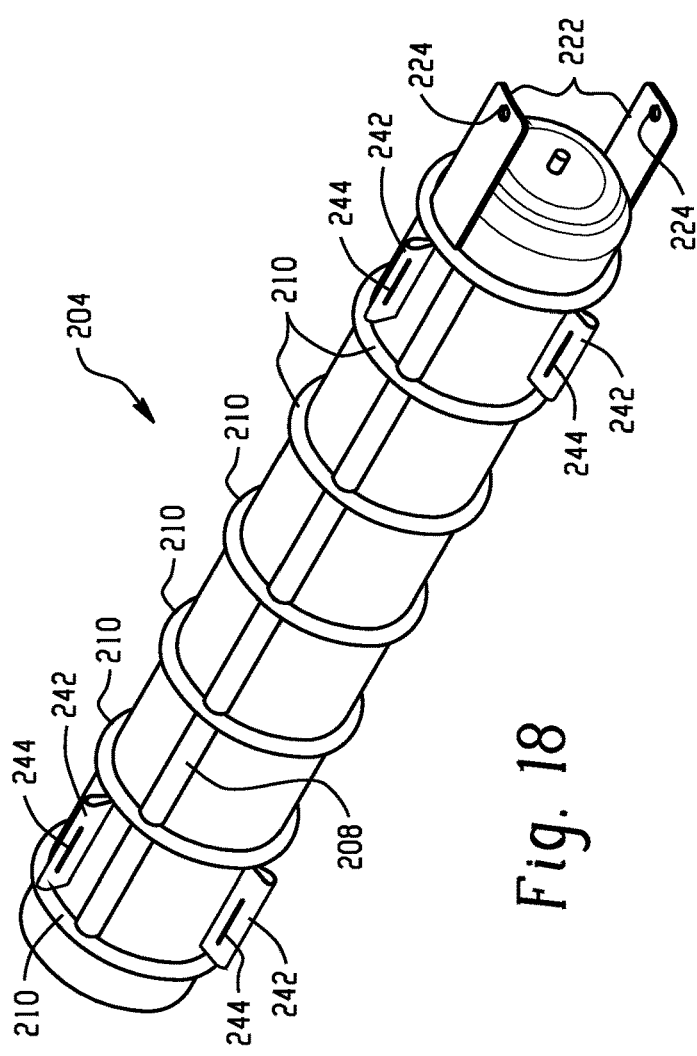
FIG. 18 is a perspective view of an alternative expansible chamber.
Figure 19:
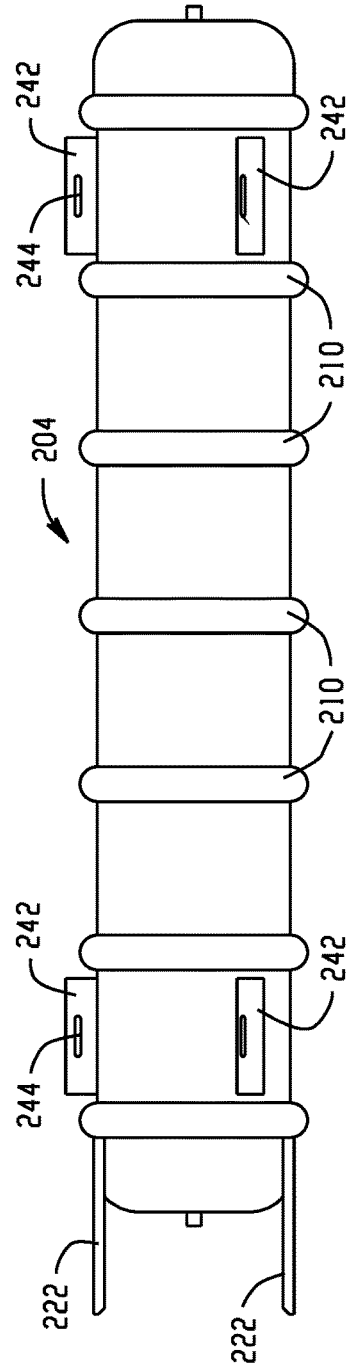
FIG. 19 is a front elevational view of the expansible chamber of FIG. 18.
Figure 20:
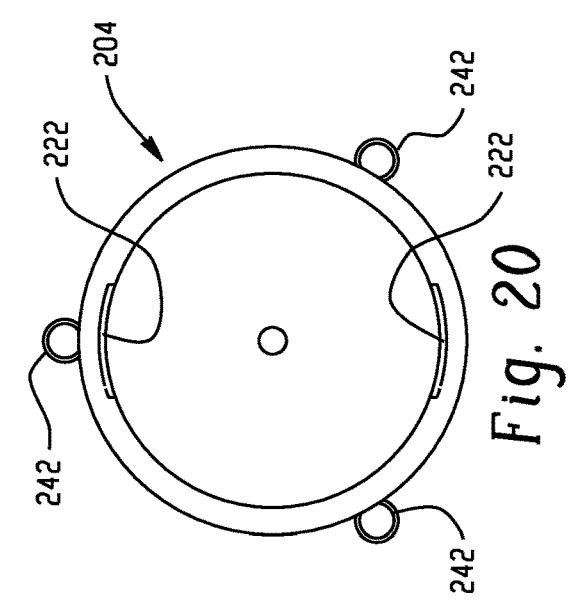
FIG. 20 is an end view taken generally from the left-hand side of FIG. 19.
Figure 21:
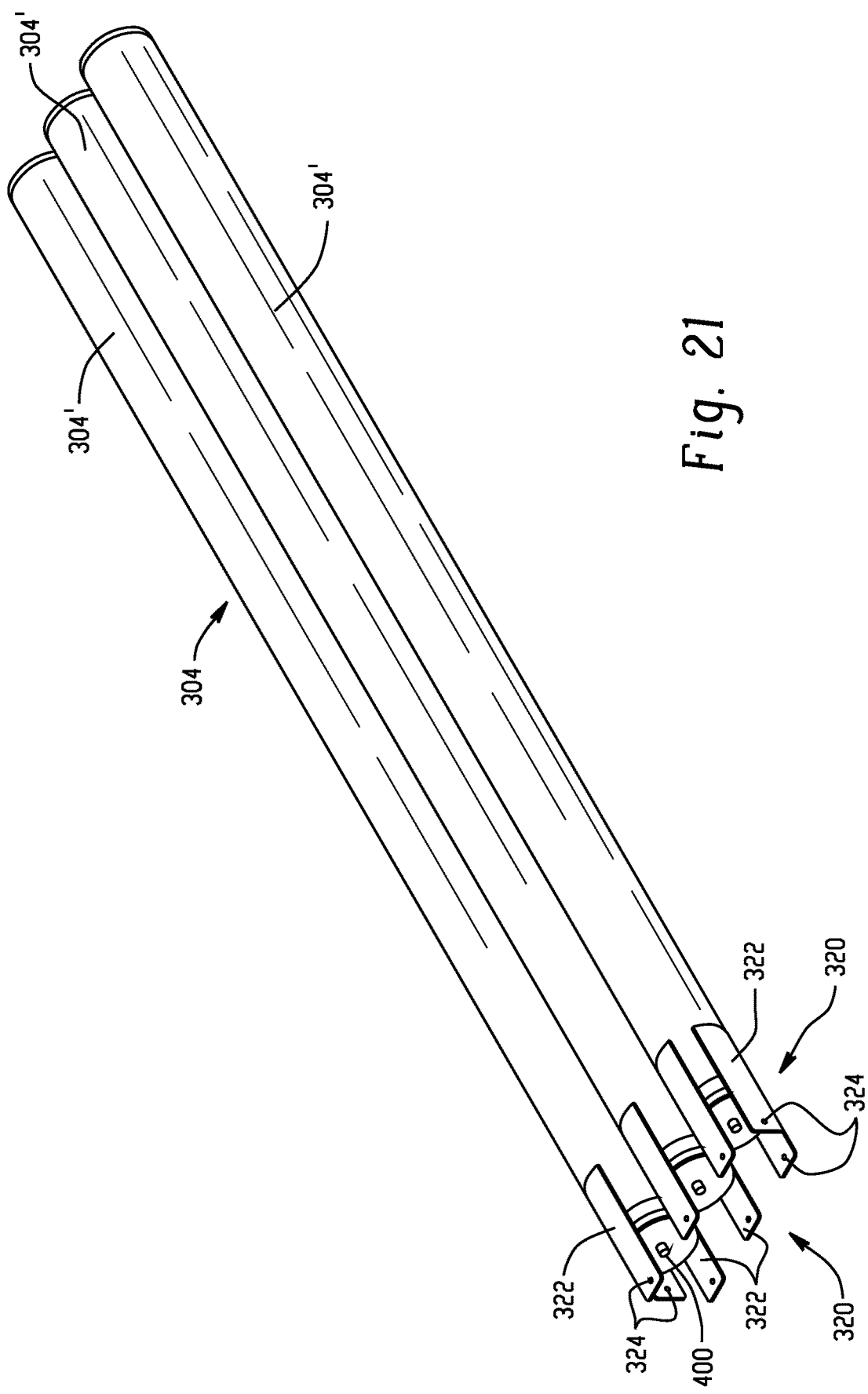
FIG. 21 is a perspective view of another expansible chamber arrangement.
Figure 25:
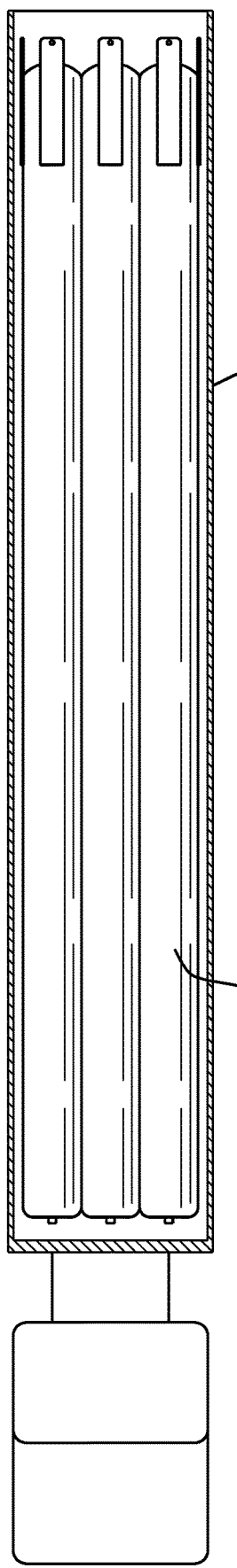
FIG. 25 is a top plan view of the expansible chamber of FIG. 21 received in the trailer.
Figure 26:
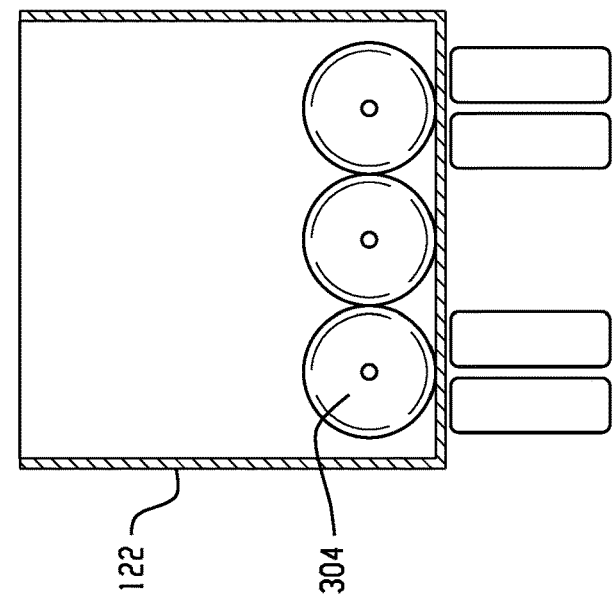
FIG. 26 is an end view taken generally from the rear (right-hand side of FIG. 25) of the trailer of FIG. 25.

The embodiment of FIGS. 18-20 uses the same reference numerals as those used to identify like components in FIGS. 9-17. The primary distinction is that the FIGS. 18-20 embodiment uses only a single longitudinal inflated rib 208. The single rib 200 still interconnects the circumferential ribs 210 to provide the desired support and stability to the bladder tank 204, while the remainder of the structure provides the other functional details described in connection with FIGS. 9-17.

FIGS. 21-28 depict another embodiment of a bladder tank 304 that has many similar characteristics associated with that the embodiment described above in connection with an individual bladder tank 204. Accordingly, like components with reference numerals in the "300" series of FIGS. 21-28 correspond to like components in the "200" series of FIGS. 9-17 (e.g., bladder tank 204 is now identified as bladder tank 304, straps 222 are now identified as straps 322, and opening 224 are now identified as opening 324). A primary distinction is that the bladder tank 304 includes three chambers or cavities 304' for storing food product such as milk therein. The bladder tank 304 is a single body comprised of the three elongated, generally cylindrical chambers 304' that allow a single bladder tank to hold approximately 5000 gallons. A similar lifting mechanism 320 may be provided at one end of the bladder tank 304. Another primary difference is that the bladder tank 304 eliminates the use of inflated ribs (such as ribs 208, 210) and instead the bladder could be inflated with air to allow the ability to clean the internal cavities of the individual chambers of the single body. Interconnecting the three chambers 304' into a single body 304 still provides the desired stability of the assembly when shipped in the trailer 122 without using ribs.

Figure 29:
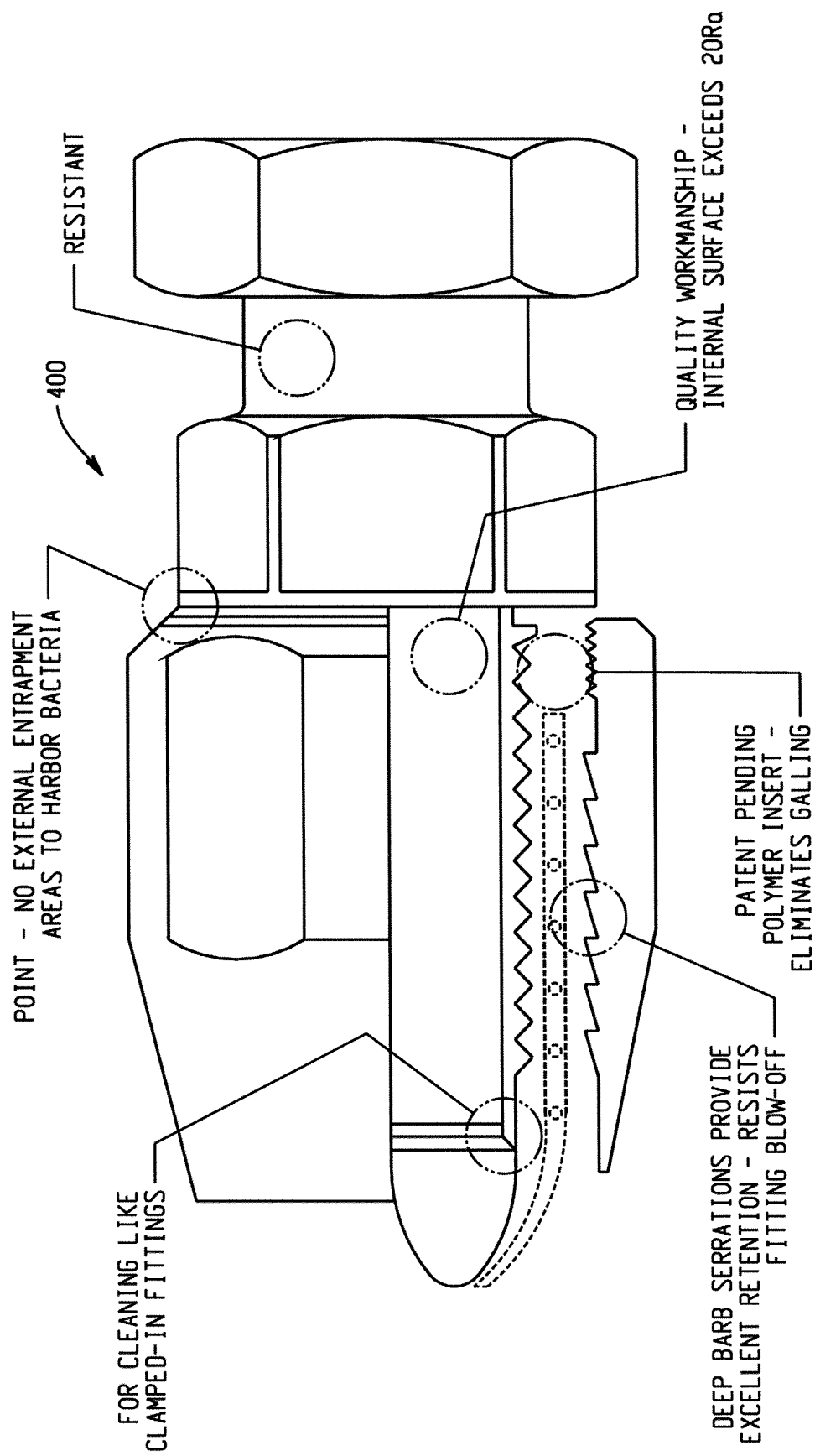
FIG. 29 is a view of a sanitary connection of the type that may be used with the expansible chambers.
Figures 32, 33, 34, 35, 36:
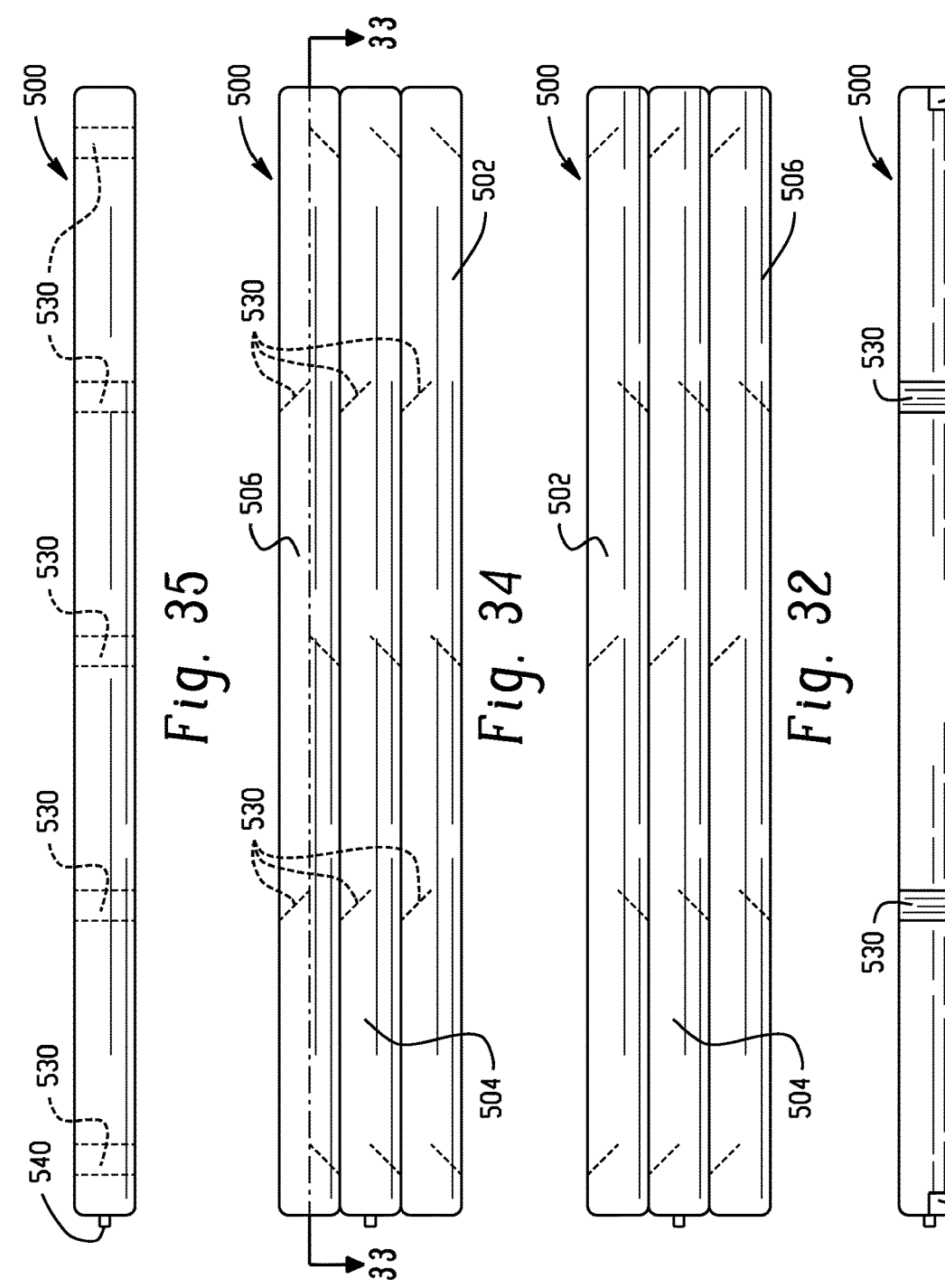
FIG. 32 is a top plan view of the bladder tank of FIG. 30.
FIG. 33 is a cross-sectional view taken generally along the lines 33-33 of FIG. 32.
FIG. 34 is a bottom plan view of the bladder tank of FIG. 30.
FIG. 35 is an elevational view of the bladder tank of FIG. 30.
FIG. 36 is a cross-sectional view taken generally along the lines 36-36 of FIG. 31.

Particular details of a sanitary connection fitting 400 are shown in FIG. 29. Generally speaking, the sanitary connection fitting 400 is conventionally known in the art and is suitable for food-grade quality fluid product. Since the particular details of the fitting 400 do not form part of the subject disclosure, the particular structural details need not be described herein since one skilled in the art will presume to have such knowledge. However, the fitting 400 is desirable for use with the bladder tanks shown and described herein since the fitting can be clamped to one end, resists blowoff, does not have entrapment areas that could otherwise harbor bacteria, and is manufactured from a high-grade material such as 316 stainless steel that is durable and chemically resistant. It will be appreciated that other fitting configurations could be used without departing from the scope and intent of the present disclosure.

Still another embodiment is illustrated in FIGS. 30-36. As shown there, the bladder tank 500 has three distinct compartments 502, 504, 506 (although a greater or lesser number of compartments could also be used). Each of the compartments 502, 504, 506 has an elongated dimension (e.g. 50 feet), for example that will fit along substantially an entire length of the bed of a conventional trailer, and has a low height (e.g. 2 feet), and a width that fits along substantially an entire width of the bed of the trailer. The distinct compartments 502, 504, 506 are in fluid communication with one another. That is, first and second weld seams 510, 512 are generally equally spaced along substantially an entirety of the length of the bladder tank 500 but opposite ends of the bladder tank are void of the longitudinal weld seams 510, 512 so that the three compartments 502, 504, 506 are in fluid communication with one another at regions 520, 522 (see FIGS. 33, 36).

In addition, and as seen in FIGS. 30, 33, 35, and 36, baffles 530 extend partially across an internal width of each individual compartment 502, 504, 506. As shown, the baffles 530 are preferably disposed at an acute angle relative to the elongated length and at an acute angle relative to the width of the compartment. Preferably the acute angle of the baffles 530 are disposed so that fluid (e.g. milk) can easily flow toward a fill/discharge valve port 540 provided at at least one end of the bladder tank 500. In the illustrated example, the baffles 530 extend from one of the seams 510, 512 or a sidewall of the bladder tank 500, and terminate approximately halfway across the width of the compartment 502, 504, 506. Moreover, sets of the baffles 530 are longitudinally spaced apart, and the baffles are also alternately disposed along the elongated length of the compartment to provide a serpentine path between the open regions 520, 522 at the ends of the bladder tank 500. That is, the baffles 530 alternately extend from a first side (either a sidewall or seam) of a compartment 502, 504, 506 and then extend from the second side of the compartment (either a sidewall or seam) along the longitudinal extent of the fluid path from one end to the other end of the bladder tank 500. The baffles 530 dampen the movement of the fluid, which is a particular problem when the trailer starts and stops.

The thickness of the bladder tank 500 of the present disclosure is substantially reduced when compared to that used in prior art arrangements. Thus, where known transport systems of bulk fluids using flexible wall, bladder-type structures have a wall thickness on the order of 160 mils, the present arrangement is on the order of 20 mils. This results in a substantial reduction in material cost.

Figure 37:
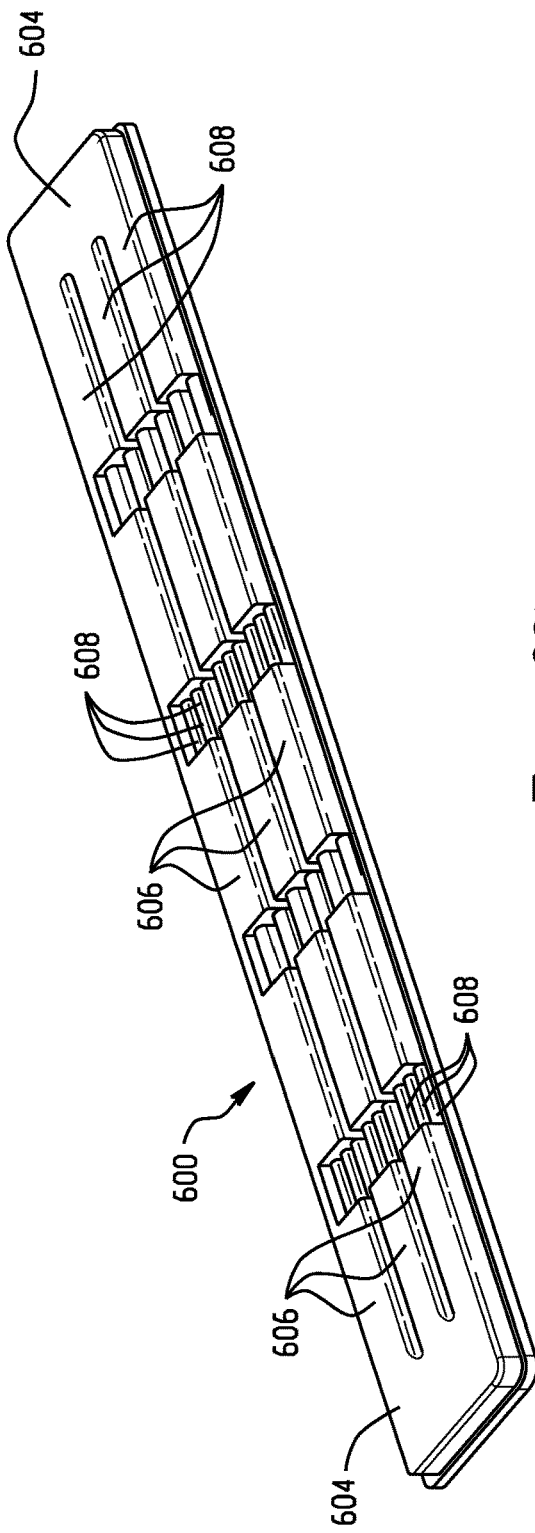
FIG. 37 is a perspective view of yet another bladder tank.
Figure 38:
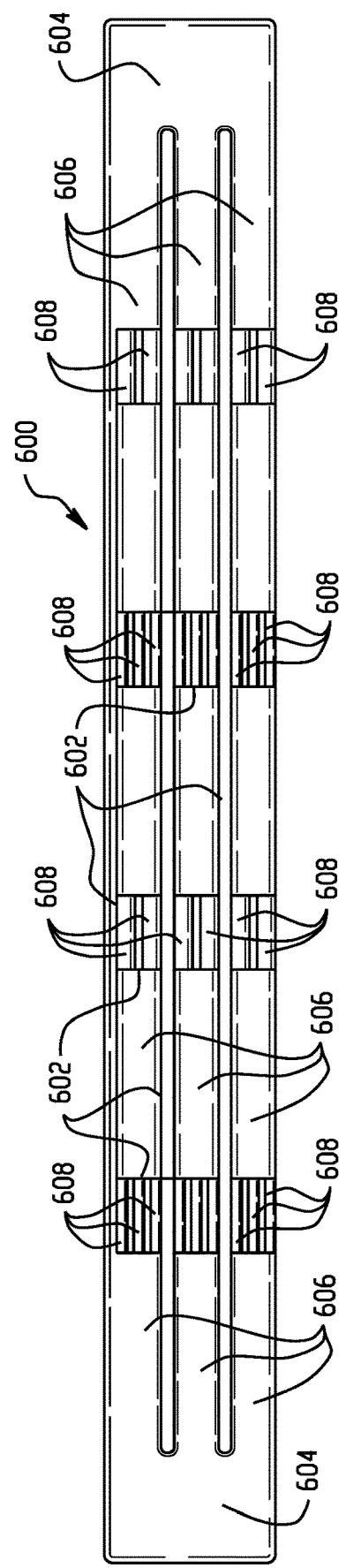
FIG. 38 is a plan view of the bladder tank of FIG. 37.

FIGS. 37 and 38 illustrate still another configuration of a bladder tank 600. Seams 602 interconnect facing surfaces that form the bladder tank and result in differently sized and interconnected tank portions. For example, enlarged bladder tank portions 604 are provided at opposite ends and subdivided into adjacent, individual bladder tank portions 606. In turn, bladder tank portions 606 are in fluid communication through smaller passages 608 with one another. Different sized tank portions 604, 606, 608 control fluid movement through the cavity of the bladder tank which can also be desirable to prevent fluid movement or sloshing during transport, but still allow inter-fluid communication between the differently sized portions.

This written description uses examples to describe the disclosure, including the best mode, and also to enable any person skilled in the art to make and use the disclosure. The patentable scope of the disclosure may include other examples that occur to those skilled in the art. Such other examples are intended to be within the scope of the disclosure if they have structural elements that do not differ from the literal description of the disclosure, or if they include equivalent structural elements with insubstantial differences from the literal description.

We claim:

1. An expansible bladder for storing an associated fluid product, the bladder comprising:
   a flexible wall enclosing an internal cavity that is selectively filled/emptied of an associated fluid product;
   at least one of a series of longitudinal and circumferential air-filled ribs formed in the flexible wall to provide at least one of structural support or limiting movement of the bladder;
   a lifting mechanism including first and second straps disposed in circumferentially spaced relation provided at one end of the bladder, the straps include openings to receive associated cables or hooks to move/lift/suspend the bladder, the straps extending longitudinally beyond an end of the bladder and axially over a fitting provided in the bladder end to provide protection to the fitting.

2. The bladder of claim 1 wherein the air-filled ribs are capable of being selectively inflated and deflated.

3. The bladder of claim 1 wherein the longitudinal ribs are circumferentially spaced apart.

4. The bladder of claim 1 wherein the circumferential ribs are longitudinally spaced apart.

5. The bladder of claim 1 further comprising a connection member located inwardly from an end of the bladder.

6. The bladder of claim 5 wherein the connection member includes an elongated opening dimensioned to receive an associated securing mechanism.

\* \* \* \* \*